(12) United States Patent
Yamamura et al.

(10) Patent No.: US 9,538,326 B2
(45) Date of Patent: Jan. 3, 2017

(54) APPARATUS AND METHOD FOR MONITORING A LOCATION OF A MOVABLE INFORMATION APPARATUS

(71) Applicant: FUJITSU LIMITED, Kawasaki-shi, Kanagawa (JP)

(72) Inventors: Shinya Yamamura, Fukuoka (JP); Kota Ejima, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/850,256

(22) Filed: Sep. 10, 2015

(65) Prior Publication Data

US 2016/0088431 A1 Mar. 24, 2016

(30) Foreign Application Priority Data

Sep. 19, 2014 (JP) ................................. 2014-191913

(51) Int. Cl.
*H04W 4/02* (2009.01)
*H04W 24/08* (2009.01)

(52) U.S. Cl.
CPC .............. *H04W 4/02* (2013.01); *H04W 24/08* (2013.01)

(58) Field of Classification Search
CPC .... H04L 41/0816; H04L 63/08; H04L 45/745; H04L 67/02; H04L 43/0817; H04L 61/1564; H04W 12/06; G06F 3/04842

USPC .......... 455/456.1, 456.5, 411, 406; 701/532; 340/539.11; 370/395.5
See application file for complete search history.

(56) References Cited

U.S. PATENT DOCUMENTS

2002/0169539 A1* 11/2002 Menard ................. G01C 21/26
701/532
2012/0252501 A1* 10/2012 Smith ................... H04W 4/008
455/456.5

FOREIGN PATENT DOCUMENTS

JP 2002-344371 11/2002
JP 2004-5251 1/2004

* cited by examiner

*Primary Examiner* — Phuoc H Doan
(74) *Attorney, Agent, or Firm* — Oblon, McClelland, Maier & Neustadt, L.L.P.

(57) ABSTRACT

A first monitoring device is disposed at a predetermined position and configured to monitor a location of an information apparatus that is movable, by performing a radio communication with the information apparatus. A second monitoring device is movable and configured to monitor a location of the information apparatus by performing the radio communication with the information apparatus. An apparatus monitoring device causes the radio communication with the information apparatus to be taken over between the first monitoring device and the second monitoring device, and collects results of monitoring the information apparatus, from the first monitoring device or the second monitoring device which has taken over the radio communication with the information apparatus.

7 Claims, 27 Drawing Sheets

FIG.6

| APPARATUS ID 45A | MAC ADDRESS 45B | MONITORING STATION ADDRESS 45C | MANAGEMENT USER INFORMATION 45D | MONITORING STATUS 45E | KEY 45F | APPARATUS INFORMATION 45G | POSTPONEMENT TIME 45H |
|---|---|---|---|---|---|---|---|
| S1 | ff:ff:ff:01 | 10.115.10.100 | user1 | UNDER MONITORING | HASH VALUE OF MANAGER ID AND APPARATUS ID | PC OF USER1 | 300 SECONDS |
| ... | ... | ... | ... | ... | ... | ... | ... |

45

APPARATUS AND METHOD FOR MONITORING A LOCATION OF A MOVABLE INFORMATION APPARATUS

CROSS-REFERENCE TO RELATED APPLICATION

This application is based upon and claims the benefit of priority from the prior Japanese Patent Application No. 2014-191913, filed on Sep. 19, 2014, the entire contents of which are incorporated herein by reference.

FIELD

The embodiments discussed herein are related to apparatus and method for monitoring a location of a movable information apparatus.

BACKGROUND

In recent years, there is a growing demand for apparatus monitoring systems that is able to monitor the location of information apparatuses in enterprises from various viewpoints, such as information leak prevention. In such apparatus monitoring systems, monitoring devices always monitor the location of the information apparatuses in radio communication between the monitoring devices and the information apparatuses, thereby preventing loss of the information apparatuses.

Related techniques are disclosed in, for example, Japanese Laid-Open Patent Publication No. 2004-5251 and Japanese Laid-Open Patent Publication No. 2002-344371.

SUMMARY

According to an aspect of the invention, a system includes a first monitoring device, a second monitoring device, and an apparatus monitoring device. The first monitoring device is disposed at a predetermined position and configured to monitor a location of an information apparatus that is movable, by performing a radio communication with the information apparatus. The second monitoring device is movable and configured to monitor a location of the information apparatus by performing the radio communication with the information apparatus. The apparatus monitoring device causes the radio communication with the information apparatus to be taken over between the first monitoring device and the second monitoring device, and collects results of monitoring the information apparatus, from the first monitoring device or the second monitoring device which has taken over the radio communication with the information apparatus.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a record configuration of an apparatus management DB, according to an embodiment;

DESCRIPTION OF EMBODIMENTS

In the conventional apparatus monitoring systems, when an information apparatus is out of the radio communication range of the monitoring devices, the location of the information apparatus is unable to be continuously monitored.

Hereinafter, an apparatus monitoring system, an apparatus monitoring device, an apparatus monitoring method and an apparatus monitoring program will be described in detail by way of embodiments with reference to the drawings. It should be understood herein that the scope of the present disclosure is not limited by these embodiments which may be in proper combination unless contradictory.

Examples

Figure 1:
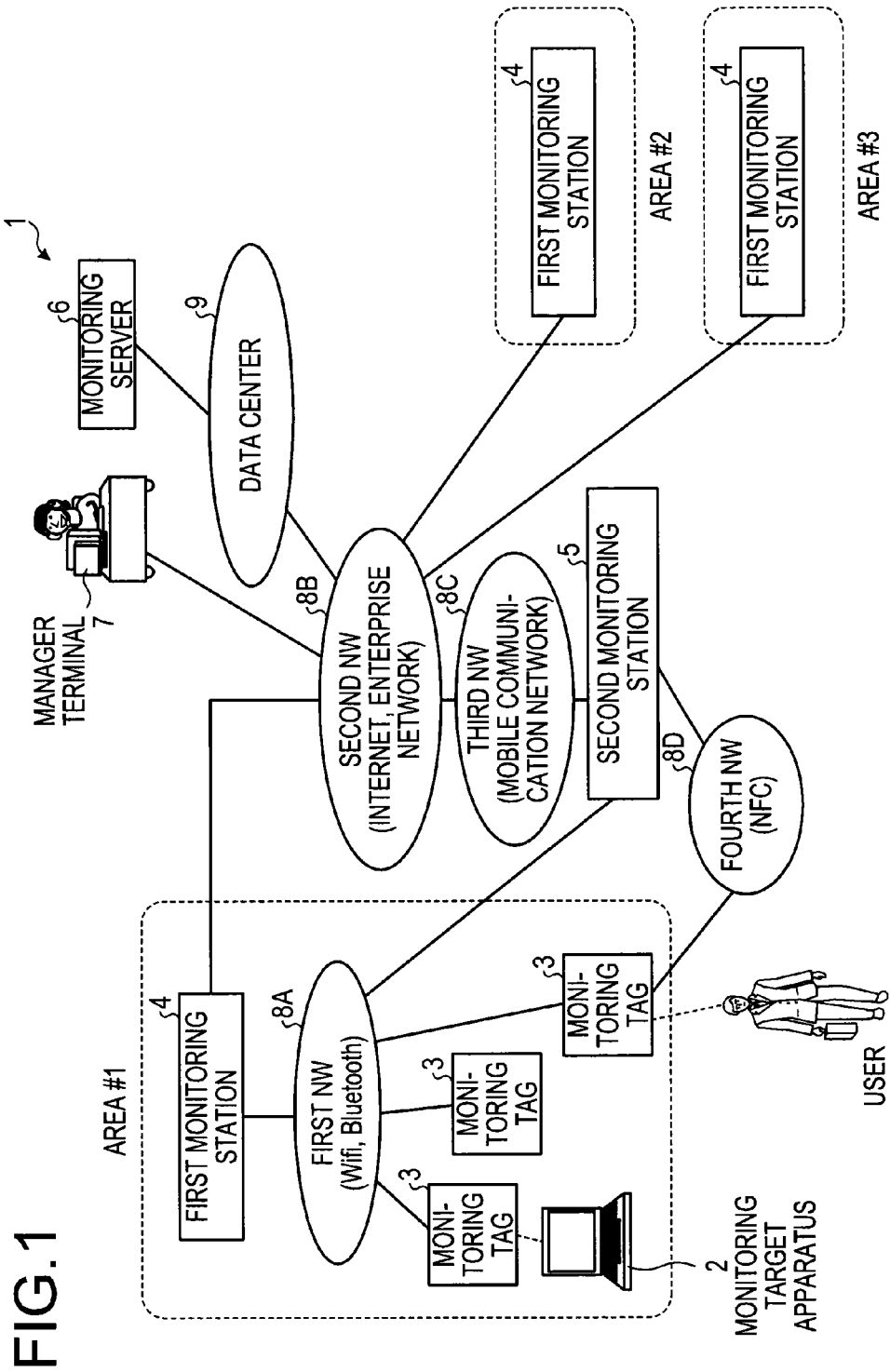
FIG. 1 is a diagram illustrating an example of an apparatus monitoring system, according to an embodiment.

FIG. 1 is an explanatory view illustrating an example of an apparatus monitoring system according to this embodiment. An apparatus monitoring system 1 illustrated in FIG. 1 includes monitoring tags 3 attached to monitoring target apparatuses 2, first monitoring stations 4, a second monitoring station 5, a monitoring server 6, and a manager terminal 7.

Each monitoring tag 3 has a short range radio communication function of performing radio communication in a first network (NW) 8A and is attached to each monitoring target apparatus 2. The first NW 8A is a local area radio communication network, such as WiFi, or Bluetooth®. An example of the monitoring target apparatus 2 attached with the monitoring tag 3 may include an information apparatus.

Each first monitoring station 4 is a stationary monitoring station which is fixedly located in each of predetermined areas #1 to #N in an enterprise and enables local area radio communication with the monitoring tag 3 within a radio communication range of the first NW 8A. The first monitoring station 4 monitors a location of the monitoring target apparatus 2 attached with the monitoring tag 3, based on the radio communication with the monitoring tag 3 using the first NW 8A. The first monitoring station 4 is connected to the monitoring server 6 via a second NW 8B, such as the Internet or an enterprise network. The first monitoring station 4 is, for example, a first monitoring device.

The second monitoring station 5 is a portable communication device, such as a smart device, to enable radio communication within a radio communication range of a third NW 8C. The third NW 8C is, for example, a mobile communication network such as 3G (Third Generation), LTE (Long Term Evolution), or WiMax communication. The second monitoring station 5 is connected to the second NW 8B via the third NW 8C. In addition, the second monitoring station 5 enables radio communication by NFC (Near Field Communication) with a monitoring tag 3 belonging to a communication range of a fourth NW 8D such as an NFC network. In addition, the second monitoring station 5 monitors a location of the monitoring target apparatus 2 attached with the monitoring tag 3, based on the radio communication with the monitoring tag 3 using the first NW 8A. The second monitoring station 5 is, for example, a second monitoring device.

The monitoring server 6, which is disposed inside a data center 9 connected to the second NW 8B, collects results of monitoring on the monitoring target apparatus 2 via the first monitoring station 4 or the second monitoring station 5, and recognizes a location of the monitoring target apparatus 2. In the apparatus monitoring system 1 illustrated in FIG. 1, it is assumed that the monitoring server 6 disposed inside the data center 9 is used to monitor the location of the monitoring target apparatus 2 with cloud services.

Figure 2:
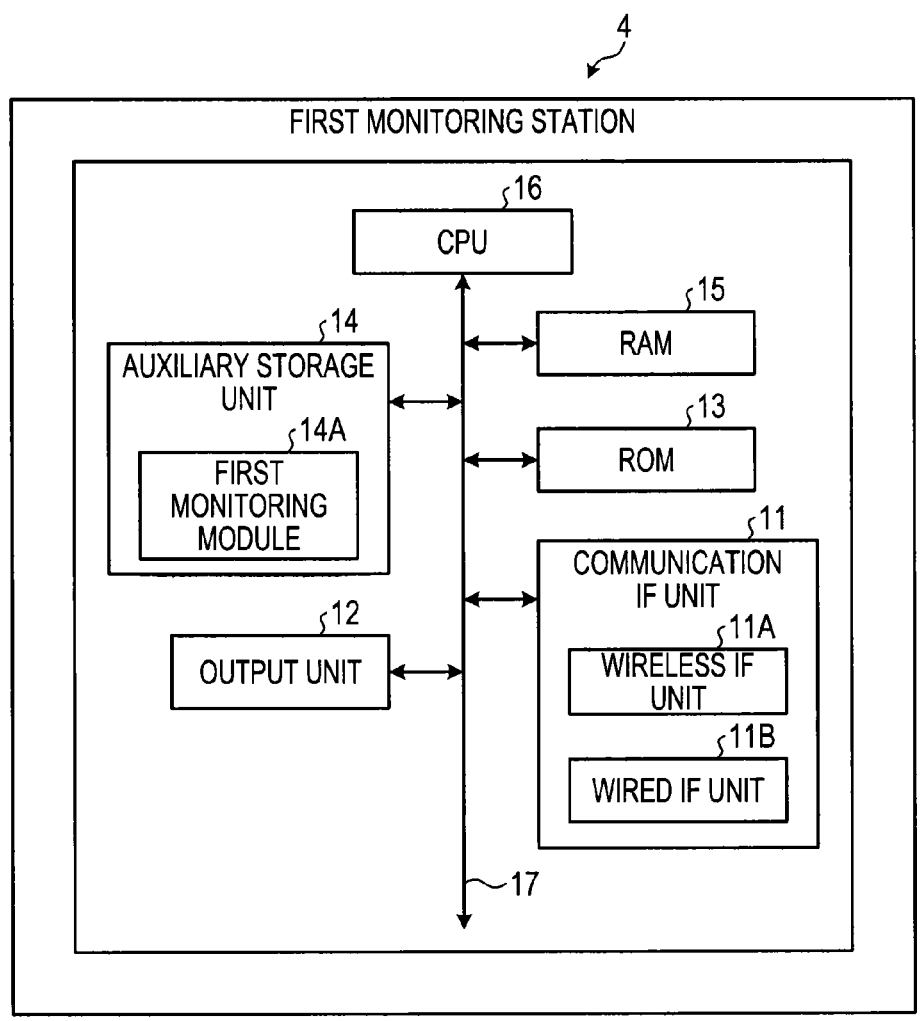
FIG. 2 is a diagram illustrating an example of a hardware configuration of a first monitoring station, according to an embodiment.

FIG. 2 is a block diagram illustrating an example of the hardware configuration of the first monitoring station 4. Referring to FIG. 2, the first monitoring station 4 includes a communication interface (IF) unit 11, an output unit 12, ROM (Read Only Memory) 13, an auxiliary storage unit 14, RAM (Random Access Memory) 15, and CPU (Central Processing Unit) 16, all of which are connected to a bus 17.

The communication IF unit 11 corresponds to an interface (IF) responsible for communication between the first NW 8A and the second NW 8B, and includes a wireless IF unit 11A and a wired IF unit 11B. The wireless IF unit 11A is an interface with the monitoring tag 3 in wireless connection with the first NW 8A, such as a radio communication card. The wired IF unit 11B is an interface with the monitoring server 6 in wired connection with the second IF unit 11B, such as an optical communication IF card, or NIC (Network Interface Card). The output unit 12 is an output interface, such as a speaker for sounding a warning sound, or a display part, such as LEDs (Light Emitting Diodes) for displaying a variety of information.

The ROM 13 is a storage area storing a variety of information and programs. The auxiliary storage unit 14 is a storage area storing programs and data of various functions of a first monitoring module 14A executed by the CPU 16. The auxiliary storage unit 14 is a nonvolatile memory, such as EPROM (Erasable Programmable ROM), or HDD (Hard Disk Drive). The auxiliary storage unit 14 stores, for example, OS (Operating System), the first monitoring module 14A, and other various application programs.

The RAM 15 is a storage area storing a variety of information. The RAM 15 corresponds to a work area into which the programs stored in the auxiliary storage unit 14 are loaded, and is, for example, a semiconductor memory used as a buffer or a cache. The CPU 16 is a control unit for controlling the entire operation of the first monitoring station 4. The CPU 16 performs a variety of processing functions by loading, for example, the OS or the first monitoring module 14A stored in the auxiliary storage unit 14 into the RAM 15 and executing it. The number of CPUs 16 is not limited to one but may be two or more.

The hardware configuration of the first monitoring station 4 is not limited to that illustrated in FIG. 2 but may be altered as appropriate. For example, the first monitoring station 4 may include a portable recording medium driver and read programs from a portable recording medium, such as a SD card.

Figure 3:
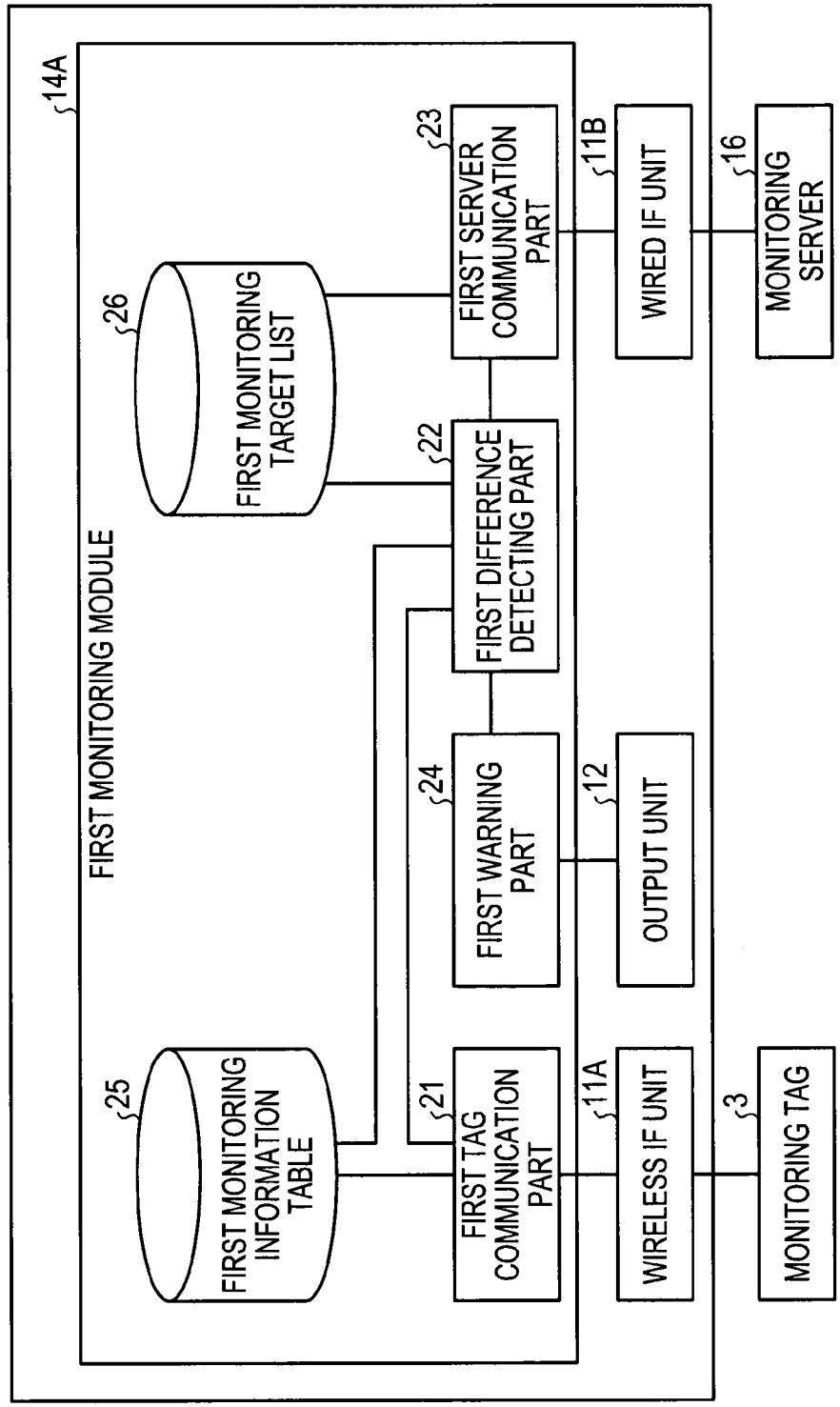
FIG. 3 is a diagram illustrating an example of a functional configuration of a first monitoring module of a first monitoring station, according to an embodiment.

FIG. 3 is a block diagram illustrating one example of the functional configuration of the first monitoring module 14A of the first monitoring station 4. Referring to FIG. 3, the first monitoring module 14A includes a first tag communication part 21, a first difference detecting part 22, a first server communication part 23, a first warning part 24, a first monitoring information table 25, and a first monitoring target list 26. The first tag communication part 21, the first difference detecting part 22, the first server communication part 23, and the first warning part 24 are various processing functions of the first monitoring module 14A in the auxiliary storage unit 14, which is executed by the CPU 16.

The first monitoring information table 25 is an area in which an MAC (Media Access Control) address of the monitoring tag 3 that has responded to a wireless beacon of the first monitoring station 4 in the first NW 8A is registered. In addition, the first monitoring information table 25 is a storage area formed in the RAM 15 or the auxiliary storage unit 14 by execution of the first monitoring module 14A.

The first monitoring target list 26 is an area in which an apparatus ID of the monitoring target apparatus 2 to be monitored by the first monitoring station 4 and the MAC address of the monitoring tag 3 attached to the monitoring target apparatus 2 are registered as a monitoring target list. The apparatus ID is identification information, such as a host name, serial number, and asset management number, for identifying the monitoring target apparatus 2. In addition, the first monitoring target list 26 is a storage area formed in the RAM 15 or the auxiliary storage unit 14 by execution of the first monitoring module 14A.

The first tag communication part 21 transmits a wireless beacon to the radio communication range of the first NW 8A via the wireless IF unit 11A. The first tag communication part 21 transmits the wireless beacon regularly, for example, every 30 seconds. The first tag communication part 21 extracts the MAC address of the monitoring tag 3 from a response of the monitoring tag 3 of the monitoring target apparatus to the wireless beacon, and registers the extracted MAC address of the monitoring tag 3 in the first monitoring information table 25.

The first warning part 24 controls the output unit 12 to output LED lighting or a warning sound. The first difference detecting part 22 compares the MAC address in the first monitoring information table 25 with the MAC address of the monitoring tag 3 of the monitoring target apparatus in the first monitoring target list 26, and extracts difference information of the MAC address from a result of the comparison. When there exists a MAC address in the first monitoring information table 25 and the MAC address does not exist in the first monitoring target list 26, the first difference detecting part 22 extracts "additional" difference information. When a MAC address does not exist in the first monitoring information table 25 and there exists the MAC address in the first monitoring target list 26, the first difference detecting part 22 extracts "lost" difference information.

The first server communication part 23 is connected to the second NW 8B via the wired IF unit 11B and is a processing unit responsible for communication with the monitoring server 6. The first server communication part 23 generates a message to be transmitted to the monitoring server 6 and processes a message received from the monitoring server 6. Although described with the processing function of execution of programs by the CPU 16, the first monitoring module 14A may be executed by hardware, such as LSI (Large Scale Integration), or FPGA (Field-Programmable Gate Array).

Figure 4:
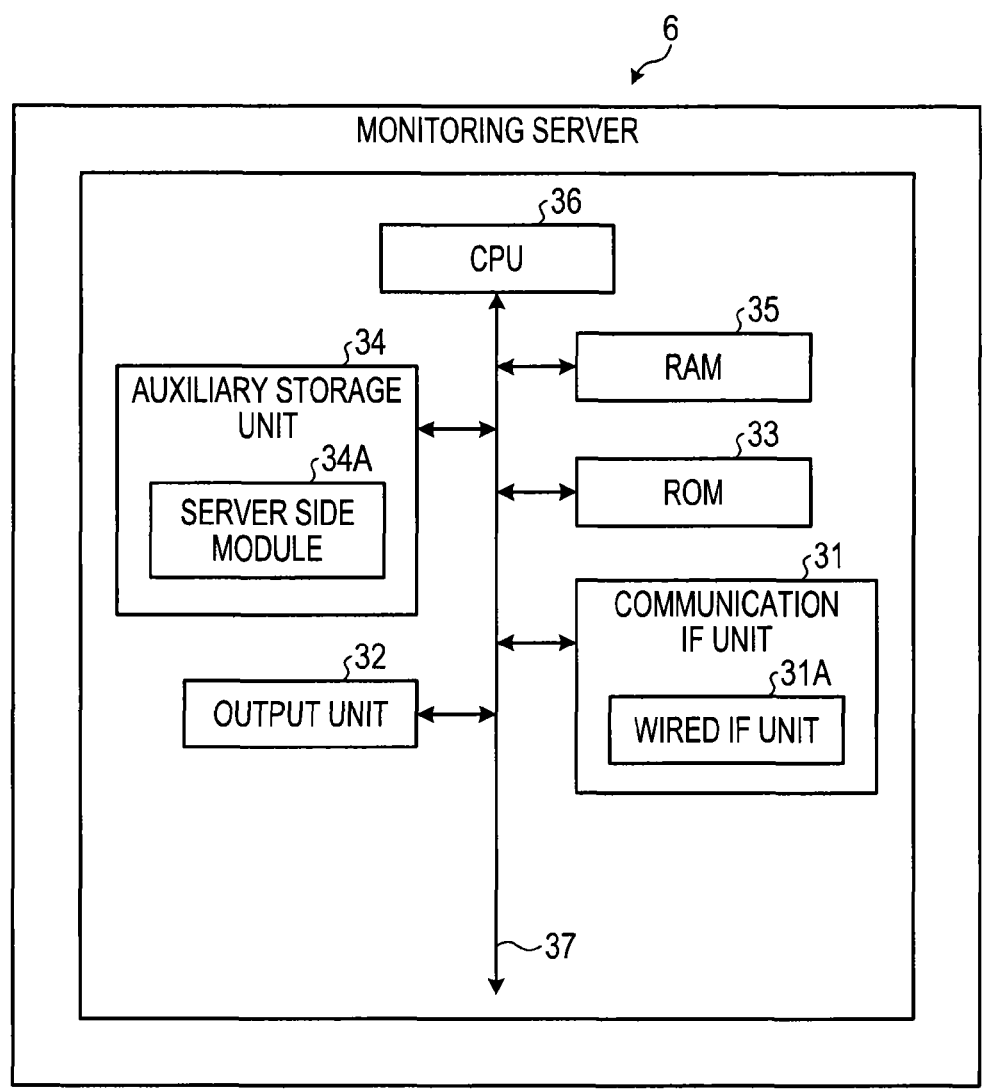
FIG. 4 is a diagram illustrating an example of a hardware configuration of a monitoring server, according to an embodiment.

FIG. 4 is a block diagram illustrating an example of the hardware configuration of the monitoring server 6. Referring to FIG. 4, the monitoring server 6 includes a communication IF unit 31, an output unit 32, ROM 33, an auxiliary storage unit 34, RAM 35, and CPU 36, all of which are connected to a bus 37.

The communication IF unit 31 corresponds to an interface responsible for communication with the second NW 8B and includes a wired IF unit 31A. The wired IF unit 31A is an interface with the monitoring server 6 in wired connection with the second NW 8B, such as an optical communication IF card or NIC. The output unit 32 is an output interface, such as a speaker for sounding a warning sound, and a display unit, for example, LEDs for displaying a variety of information.

The ROM 33 is a storage area storing a variety of information and programs. The auxiliary storage unit 34 is a storage area storing programs and data of various functions of a server side module 34A executed by the CPU 36. The auxiliary storage unit 34 is a nonvolatile memory, such as EPROM, or HDD. The auxiliary storage unit 34 stores, for example, OS, the server side module 34A, and other various application programs.

The RAM 35 is a storage area storing a variety of information. The RAM 35 corresponds to a work area into which the programs stored in the auxiliary storage unit 34 are loaded, and is, for example, a semiconductor memory used as a buffer or a cache. The CPU 36 is a control unit for controlling the entire operation of the monitoring server 6. The CPU 36 performs a variety of processing functions by loading, for example, the OS, or the server side module 34A stored in the auxiliary storage unit 34 into the RAM 35, and executing it. The number of CPUs 36 is not limited to one but may be two or more.

The hardware configuration of the monitoring server 6 is not limited to that illustrated in FIG. 4 but may be altered as appropriate. For example, the monitoring server 6 may include a portable recording medium driver and read programs from a portable recording medium, such as a SD card.

Figure 5:
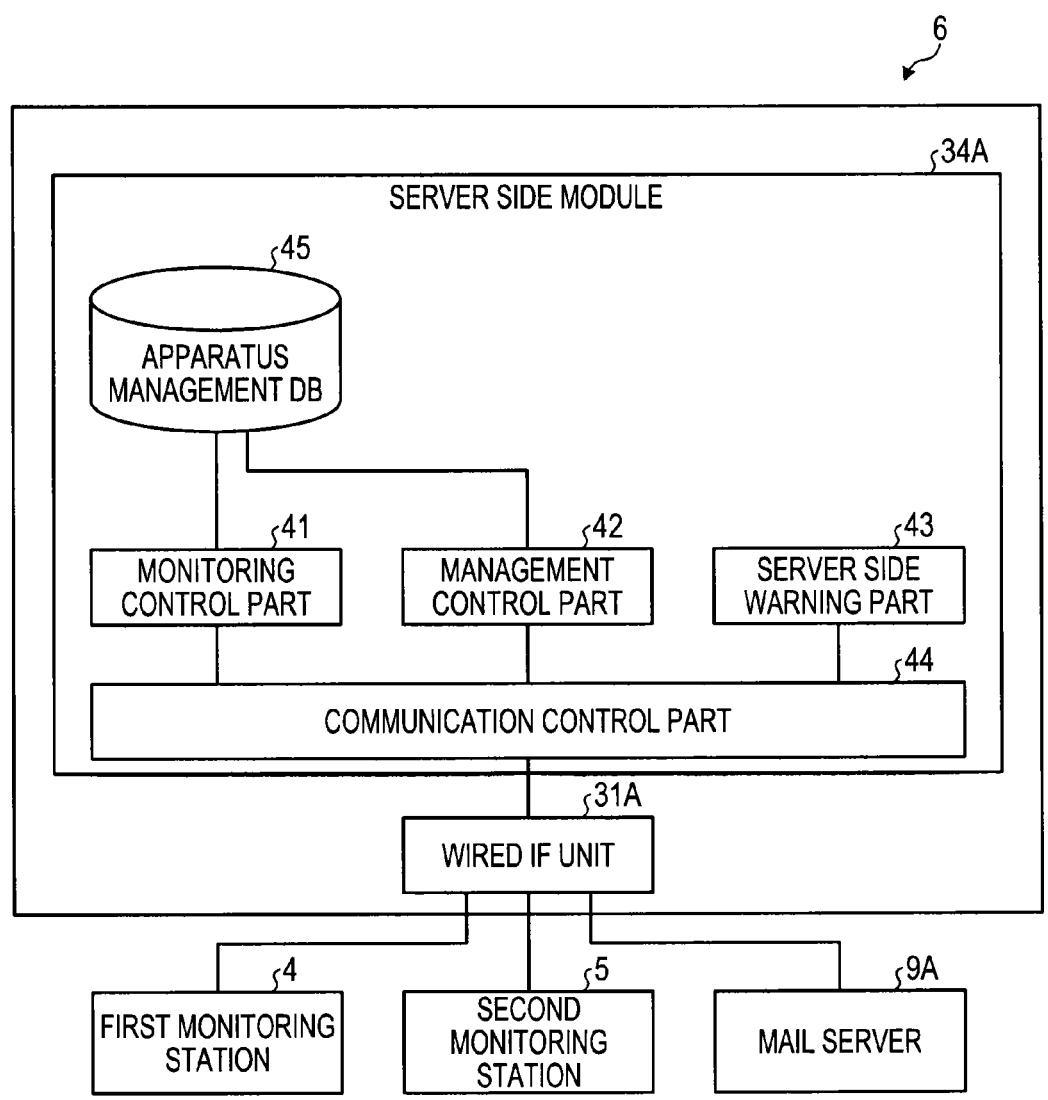
FIG. 5 is a diagram illustrating an example of a functional configuration of a server side module of a monitoring server, according to an embodiment.

FIG. 5 is a block diagram illustrating an example of the functional configuration of the server side module 34A of the monitoring server 6. Referring to FIG. 5, the server side module 34A includes a monitoring control part 41, a management control part 42, a server side warning part 43, a communication control part 44, and an apparatus management DB 45. The monitoring control part 41, the management control part 42, the server side warning part 43, and the communication control part 44 are various processing functions of the server side module 34A in the auxiliary storage unit 34, which are executed by the CPU 36.

The monitoring control part 41 receives a difference notification message from the first monitoring station 4 or the second monitoring station 5, and controls a warning on loss of the monitoring target apparatus 2 or the monitoring contents of the first monitoring station 4 or the second monitoring station 5, based on difference information in the difference notification message. The management control part 42 receives a request for registration, taking-out, and taking-in, from the second monitoring station 5, controls the monitoring contents of the first monitoring station 4 or the second monitoring station 5, and controls update of the contents of the apparatus management DB 45. The server side warning part 43 generates a warning mail when the monitoring target apparatus 2 is lost, and transmits the generated warning mail to the manager terminal 7 or a user's particular terminal via a mail server 9A. The monitoring control part 41 and the management control part 42 enable mutual takeover of radio communication of the monitoring tag 3 between the first monitoring station 4 and the second monitoring station 5. The monitoring control part 41 and the management control part 42 are a control unit and a collecting unit, which collect results of the monitoring on the location of the monitoring target apparatus 2 from one of the first monitoring station 4 and the second monitoring station 5 that has taken over the radio communication of the monitoring tag 3.

The communication control part 44 is connected to the wired IF 31A, receives a message from the first monitoring station 4 or the second monitoring station 5, and starts the monitoring control part 41 and the management control part 42, based on the received message. In addition, the communication control part 44 receives a communication request from the monitoring control unit 41, the management control part 42, and the server side warning part 43, and transmits, for example, a message to the first monitoring station 4, the second monitoring station 5, or various devices, such as the mail server 9A. Although the server side module 34A has been described with the processing function to execute the programs by means of the CPU 36, the server side module 34A may be executed by hardware, such as LSI or FPGA.

FIG. 6 is an explanatory view illustrating an example of the record configuration of the apparatus management DB 45. Referring to FIG. 6, the apparatus management DB 45 is an area for managing information of the monitoring target apparatus 2 in association with an apparatus ID 45A, an MAC address 45B, a monitoring station address 45C, a management user information 45D, a monitoring status 45E, a key 45F, apparatus information 45G, and postponement time 45H. In addition, the apparatus management DB 45 is a storage area formed in the RAM 35 or the auxiliary storage unit 34 by execution of the server side module 34A.

The apparatus ID 45A is identification information, such as a host name, serial number, asset management number, for identifying the monitoring target apparatus 2. The MAC address 45B is an MAC address of the monitoring tag 3 attached to the monitoring target apparatus 2. The monitoring station address 45C is an IP address of a monitoring station, such as the first monitoring station 4 or the second monitoring station 5, which is monitoring the monitoring tag 3 of the monitoring target apparatus 2 via the first NW 8A. The management user information 45D corresponds to information for identifying a user of the monitoring target apparatus 2, such as a user name or an employee number. The monitoring status 45E is status information coded by numerals, which indicates the status of the monitoring tag 3 of the monitoring target apparatus 2, such as "under monitoring," "lost," and "under holding". The status information "under monitoring" indicates the status of presence of a response of the monitoring tag 3 to a wireless beacon and the status information "lost" indicates the status of absence of a response of the monitoring tag 3 to a wireless beacon.

The key 45F is encryption information for indicating the right of access to this entry, which is used to permit only a user who registered the monitoring target apparatus 21, to apply for registration or taking-out of the monitoring target apparatus 2. For example, the key 45F is a hash value of a character code of each of the manager ID and the apparatus ID. The apparatus information 45G corresponds to additional information of the monitoring target apparatus 2, such as a host name, asset management number, serial number, and maker of the monitoring target apparatus 2. The postponement time 45H is information indicating postponement time taken for the monitoring server 6 to determine that the monitoring target apparatus 2 is lost. Setting the postponement time allows providing high mobility of the monitoring target apparatus 2 over the radio communication range of a plurality of first monitoring stations 4 and suppressing an excessive warning by the apparatus monitoring system 1 against temporary deterioration of the radio communication. In addition, the postponement 45H may be appropriately varied depending on the setting operation of a manager and is set at 300 seconds in the example of FIG. 6.

On detecting the difference information of "lost," the monitoring control part 41 starts count of lapse time after a difference notification message of "lost" is received for the first time, and determines whether or not the lapse time is within the postponement time corresponding to the apparatus ID of the monitoring target apparatus 2 which is notified by the difference notification message. When the lapse time is within the postponement time, the monitoring control part 41 updates the monitoring status 45E, which corresponds to the apparatus ID 45A of the monitoring target apparatus 2 of "under monitoring," to "under holding." When the lapse time exceeds the postponement time, the monitoring control part 41 updates the monitoring status 45E, which corresponds to the apparatus ID 45A of the monitoring target apparatus 2 of "under holding," to "lost."

The management control part 42 receives a request for registration, taking-out, or taking-in, from the second monitoring station 5, generates a message of approval or disapproval to the reception of the request, and transmits the message to the second monitoring station 5.

Figure 7:
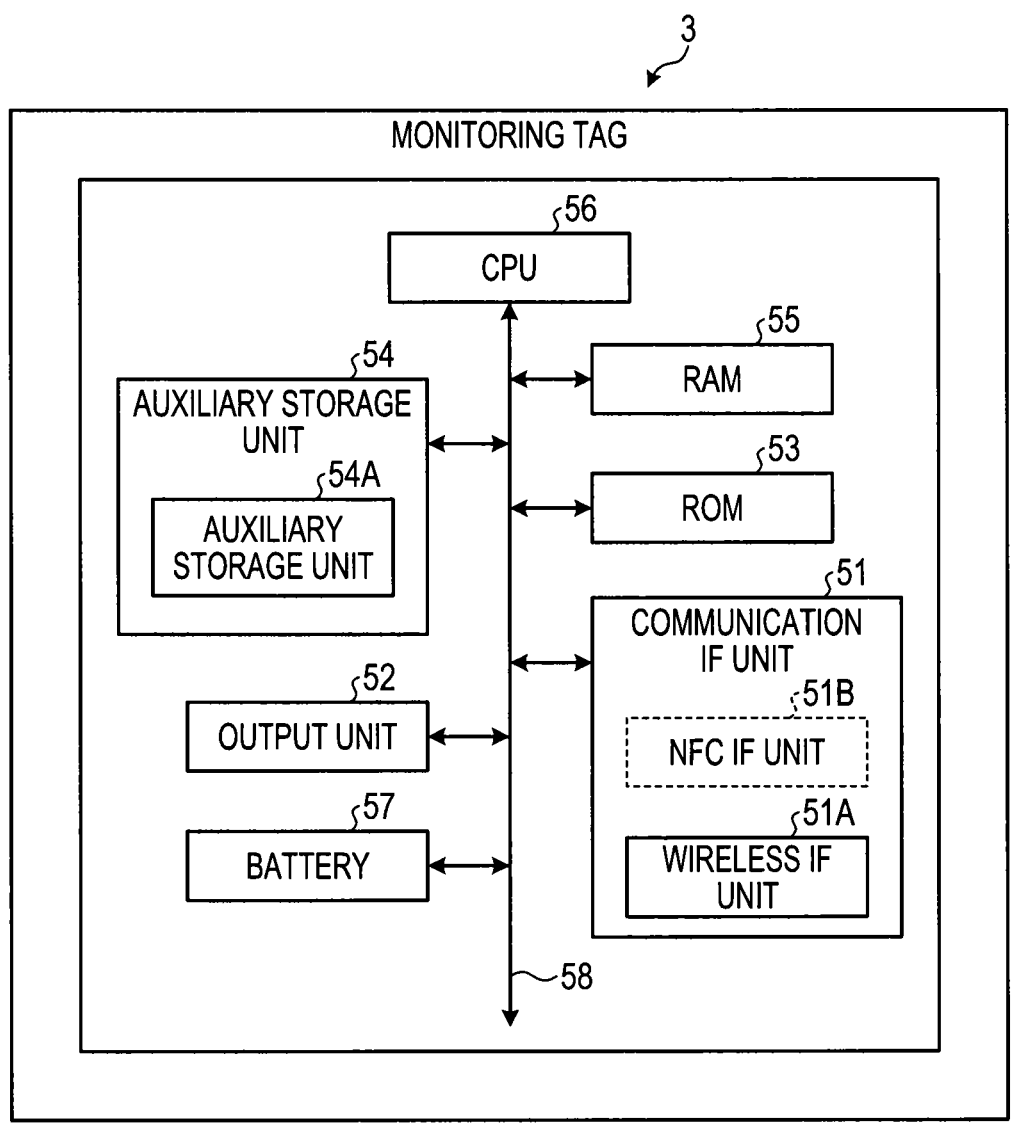
FIG. 7 is a diagram illustrating an example of a hardware configuration of a monitoring tag, according to an embodiment.

FIG. 7 is a block diagram illustrating an example of the hardware configuration of the monitoring tag 3. Referring to FIG. 7, the monitoring tag 3 includes a communication IF unit 51, an output unit 52, ROM 53, an auxiliary storage unit 54, RAM 55, CPU 56, and a battery 57, all of which are connected to a bus 58.

The communication IF unit 51 corresponds to an interface responsible for communication with the first NW 8A and the fourth NW 8D, and includes a wireless IF unit 51A and an NFC IF unit 51B. The wireless IF unit 51A is an interface which makes wireless connection with the first NW 8A. The NFC IF unit 51B is an interface which makes wireless connection with the fourth NW 8D. For example, the NFC IF unit 51B is a local area radio communication interface specified by local area radio communication standards, such as ISO/IEC 15693, and ISO/IEC 21481. The NFC IF unit 51B may be substituted with, for example, a bar code, or a manual input by a user. The output unit 52 is an output interface, such as a speaker for sounding a warning sound, and a display part, for example, LEDs for displaying a variety of information.

The ROM 53 is a storage area storing a variety of information and programs. The auxiliary storage unit 54 is a storage area storing programs and data of various functions of a tag side module 54A executed by the CPU 56. The auxiliary storage unit 54 is a nonvolatile memory, such as EPROM, or HDD. The auxiliary storage unit 54 stores, for example, OS, the tag side module 54A, and other various application programs.

The RAM 55 is a storage area storing a variety of information. The RAM 55 corresponds to a work area into which the programs stored in the auxiliary storage unit 54 are loaded, and is, for example, a semiconductor memory used as a buffer or a cache. The CPU 56 is a control unit for controlling the entire operation of the monitoring tag 3. The CPU 56 performs a variety of processing functions, for example, by loading the OS, or the tag side module 54A stored in the auxiliary storage unit 54 into the RAM 55, and executing it. The number of CPUs 56 is not limited to one but may be two or more. The battery 57 is provided to supply power to the monitoring tag 3, thereby allowing the monitoring tag 3 to continue to operate autonomously.

The hardware configuration of the monitoring tag 3 is not limited to that illustrated in FIG. 7 but may be altered as appropriate. For example, the monitoring tag 3 may include a portable recording medium driver and read programs from a portable recording medium, such as a SD card.

Figure 8:
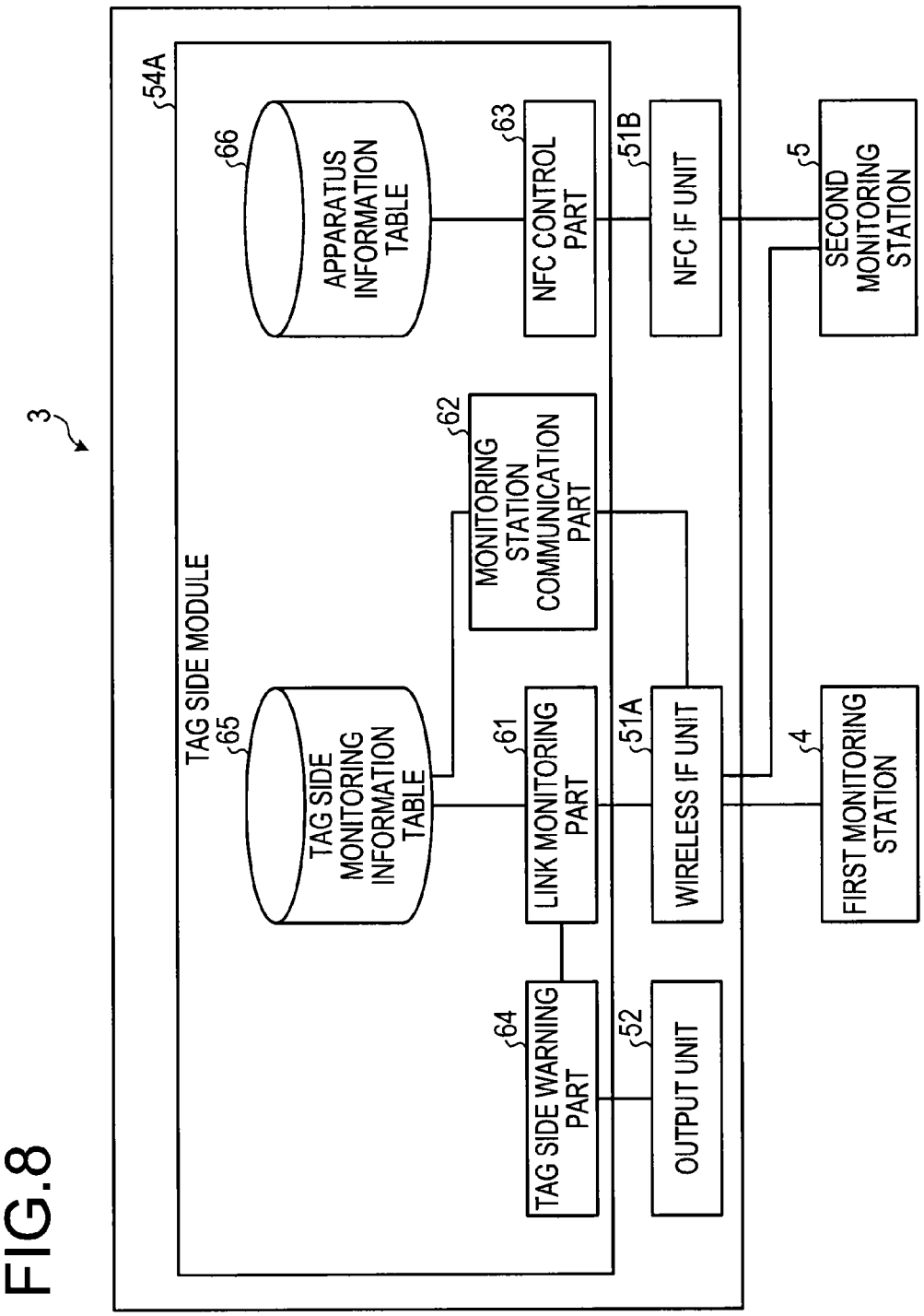
FIG. 8 is a diagram illustrating an example of a functional configuration of a tag side module of a monitoring tag, according to an embodiment.

FIG. 8 is a block diagram illustrating one example of the functional configuration of the tag side module 54A of the monitoring tag 3. The tag side module 54A includes a link monitoring part 61, a monitoring station communication part 62, an NFC control part 63, a tag side warning part 64, a tag side monitoring information table 65, and an apparatus information table 66. The link monitoring part 61, the monitoring station communication part 62, the NFC control part 63, and the tag side warning part 64 are various processing functions of the tag side module 54A in the auxiliary storage unit 54, which are executed by the CPU 56.

The tag side monitoring information table 65 is, for example, a storage part storing an IP address of the first monitoring station 4 or the second monitoring station 5 under current monitoring. The apparatus information table 66 stores an MAC address of the monitoring tag 3 and apparatus information, such as an apparatus ID of the monitoring target apparatus 2 attached with the monitoring tag 3.

The link monitoring part 61 is, for example, an extracting part which starts every time it receives a wireless beacon within the radio communication range of the first NW 8A via the wireless IF unit 51A, and extracts a transmission source IP address, for example, the IP address of the first monitoring station 4, from the received wireless beacon. The tag side warning part 64 controls the output unit 52 to perform warning processing to output notification information, such as LED lighting or warning sounding. The link monitoring part 61 compares the extracted IP address with an IP address registered in the tag side monitoring information table 66. When both addresses are not equal to each other, the tag side warning part 64 performs the warning processing.

The monitoring station communication part 62 establishes communication session with the first monitoring station 4 which has transmitted the wireless beacon via the wireless IF unit 51A, and registers the extracted IP address of the first monitoring station 4 in the tag side monitoring information table 65 when the communication session is writing of associated information. The NFC control part 63 controls writing and reading of the contents of the apparatus information table 66 via the NFC IF unit 51B. Although the tag side module 54A has been described with the processing function to execute the programs by means of the CPU 56, the tag side module 54A may be executed by hardware, such as LSI or FPGA.

Figure 9:
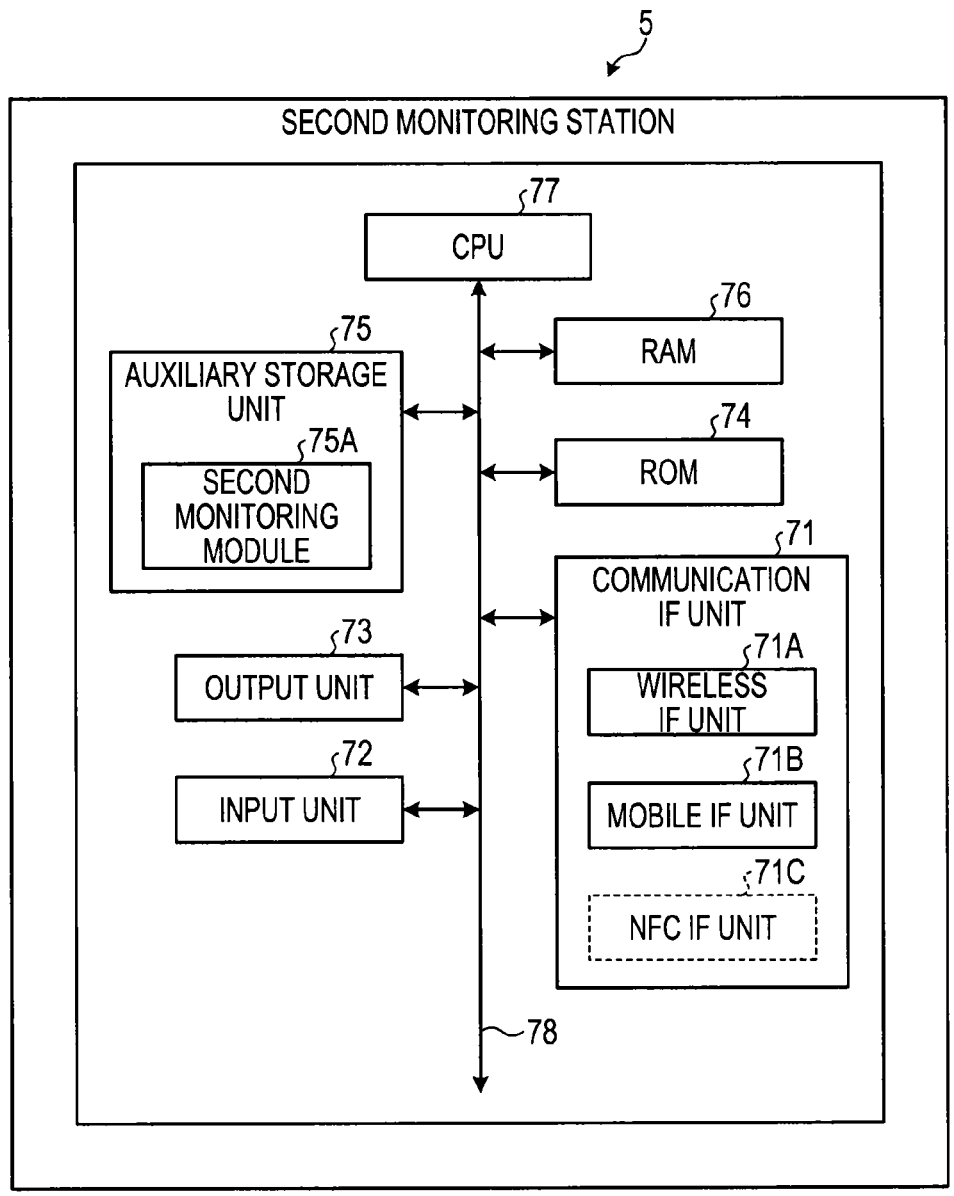
FIG. 9 is a diagram illustrating an example of a hardware configuration of a second monitoring station, according to an embodiment.

FIG. 9 is a block diagram illustrating one example of the hardware configuration of the second monitoring station 5. Referring to FIG. 9, the second monitoring station 5 includes a communication IF unit 71, an input unit 72, an output unit 73, ROM 74, an auxiliary storage unit 75, RAM 76, and CPU 77, all of which are connected to a bus 78.

The communication IF unit 71 corresponds to an interface responsible for communication with the first NW 8A, the third NW 8C, and the fourth NW 8D, and includes a wireless IF unit 71A, a mobile IF unit 71B, and an NFC IF unit 71C. The wireless IF unit 71A is an interface, such as a wireless card, which makes wireless connection with the first NW 8A. The mobile IF unit 71B is an interface, such as a wireless card, which makes wireless connection with the third NW 8C. The NFC IF unit 71C is an interface which makes wireless connection with the fourth NW 8D. For example, the NFC IF unit 71C is a local area radio communication interface specified by local area radio communication standards. The NFC IF unit 71C may be substituted with, for example, a bar code, or a manual input by a user.

The input unit 72 is an input interface, such as an operating unit to input or select a variety of information. The output unit 73 is an output interface, such as a speaker for sounding a warning sound, or a display part, for example, LEDs for displaying a variety of information. The ROM 74 is a storage area storing a variety of information and programs. The auxiliary storage unit 75 is a storage area storing programs and data of various functions of the second monitoring module 75A executed by the CPU 77. The auxiliary storage unit 75 is a nonvolatile memory, such as EPROM or HDD. The auxiliary storage unit 75 holds, for example, OS, the second monitoring module 75A, and other various application programs.

The RAM 76 is a storage area storing a variety of information. The RAM 76 corresponds to a work area into which the programs stored in the auxiliary storage unit 75 are loaded, and is, for example, a semiconductor memory used as a buffer or a cache. The CPU 77 is a control unit for controlling the entire operation of the second monitoring station 5. The CPU 77 performs a variety of processing functions by loading, for example, the OS, or the second monitoring module 75A stored in the auxiliary storage unit 75 into the RAM 76, and executing it. The number of CPUs 77 is not limited to one but may be two or more.

The hardware configuration of the second monitoring station 5 is not limited to that illustrated in FIG. 9 but may be altered as appropriate. For example, the second monitoring station 5 may include a portable recording medium driver and read programs from a portable recording medium, such as a SD card.

Figure 10:
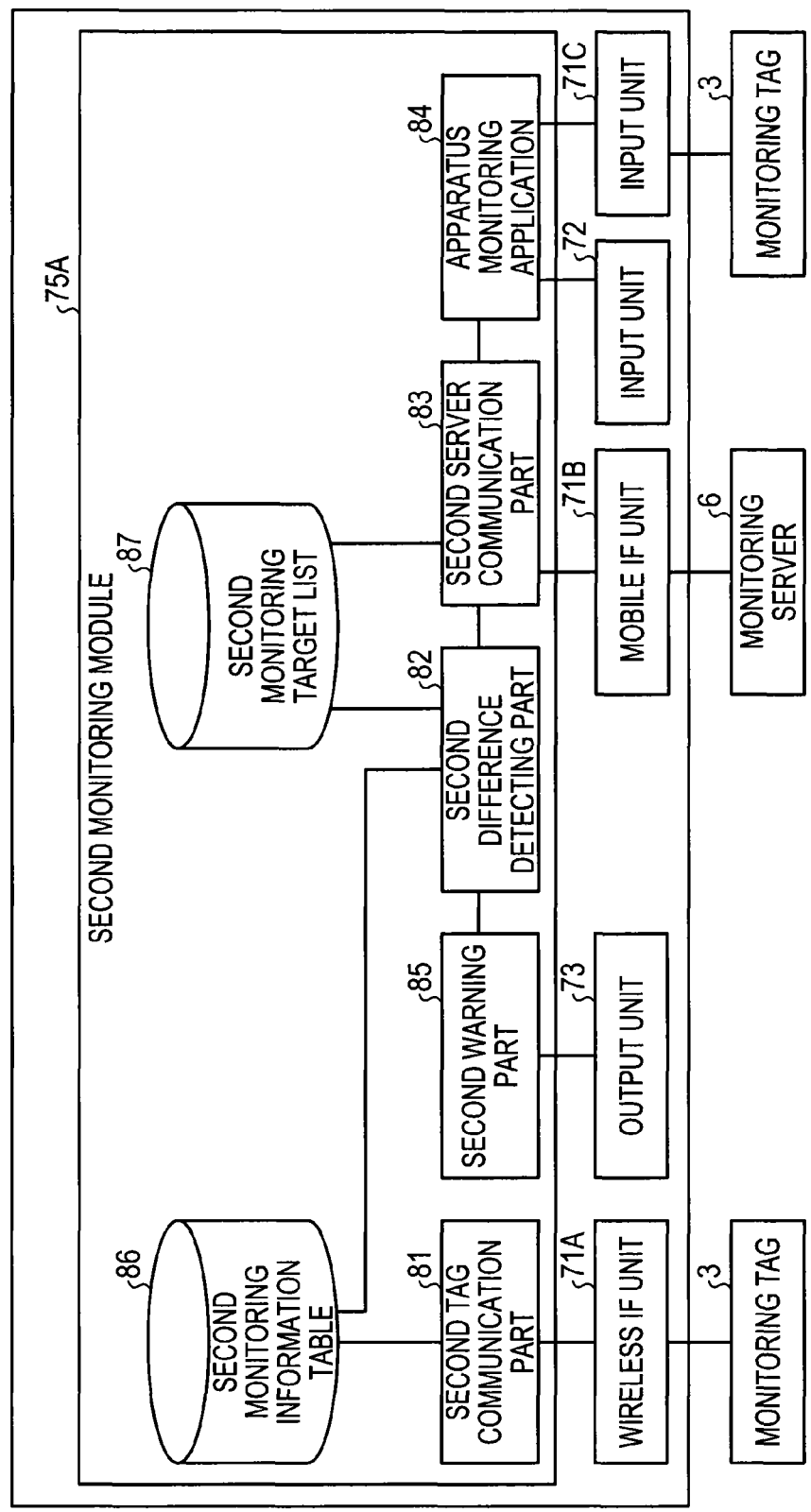
FIG. 10 is a diagram illustrating an example of a functional configuration of a second monitoring module of a second monitoring station, according to an embodiment.

FIG. 10 is a block diagram illustrating an example of the functional configuration of the second monitoring module 75A of the second monitoring station 5. The second monitoring module 75A includes a second tag communication part 81, a second difference detecting part 82, a second server communication part 83, an apparatus monitoring application 84, a second warning part 85, a second monitoring information table 86, and a second monitoring target list 87. The second tag communication part 81, the second difference detecting part 82, the second server communication part 83, the apparatus monitoring application 84, and the second warning part 85 are various processing functions of the second monitoring module 75A in the auxiliary storage unit 75, which are executed by the CPU 77.

The second monitoring information table 86 is an area in which an MAC address of the monitoring tag 3 responding to a wireless beacon of the second monitoring station 5 in the first NW 8A is registered. In addition, the second monitoring information table 86 is a storage area formed in the RAM 76 or the auxiliary storage unit 75 by execution of the second monitoring module 75A.

The second monitoring target list 87 is an area in which an apparatus ID of the monitoring target apparatus 2 to be monitored by the second monitoring station 5 and the MAC address of the monitoring tag 3 attached to the monitoring target apparatus 2 are registered as a monitoring target list. In addition, the second monitoring target list 87 is a storage area formed in the RAM 76 or the auxiliary storage unit 75 by execution of the second monitoring module 75A.

The second tag communication part 81 transmits a wireless beacon to the radio communication range of the first NW 8A via the wireless IF unit 71A. The second tag communication part 81 extracts the MAC address of the monitoring tag 3 from a response of the monitoring tag 3 of the monitoring target apparatus to the wireless beacon, and registers the extracted MAC address of the monitoring tag 3 in the second monitoring information table 86.

The second warning part 85 controls the output unit 73 to output LED lighting or a warning sound. The second difference detecting part 82 compares the MAC address in the second monitoring information table 86 with the MAC address of the monitoring tag 3 of the monitoring target apparatus in the second monitoring target list 87, and extracts difference information of the MAC address from a result of the comparison. When there exists a MAC address in the second monitoring information table 86 and the MAC address does not exist in the second monitoring target list 87, the second difference detecting part 82 extracts "additional" difference information. When a MAC address does not exist in the second monitoring information table 86 and there exists the MAC address in the second monitoring target list 87, the second difference detecting part 82 extracts "lost" difference information. In addition, even when there is no difference, the second difference detecting part 82 extracts difference information of "no difference."

The second server communication part 83 is a processing part responsible for communication with the monitoring server 6 via the mobile IF unit 71B. The second server communication part 83 generates a message to be transmitted to the monitoring server 6 and processes a message received from the monitoring server 6. In addition, when the second difference detecting part 82 extracts difference information of "no difference," the second server communication part 83 transmits a difference notification message to the monitoring server 6.

The apparatus monitoring application 84 provides an interface for request for registration, taking-out, and taking-in of the monitoring target apparatus 2 and generates various messages to be transmitted to the monitoring server 6. Although described with the processing function of execution of programs by the CPU 77, the second monitoring module 75A may be executed by hardware, such as LSI or FPGA.

Figure 11:
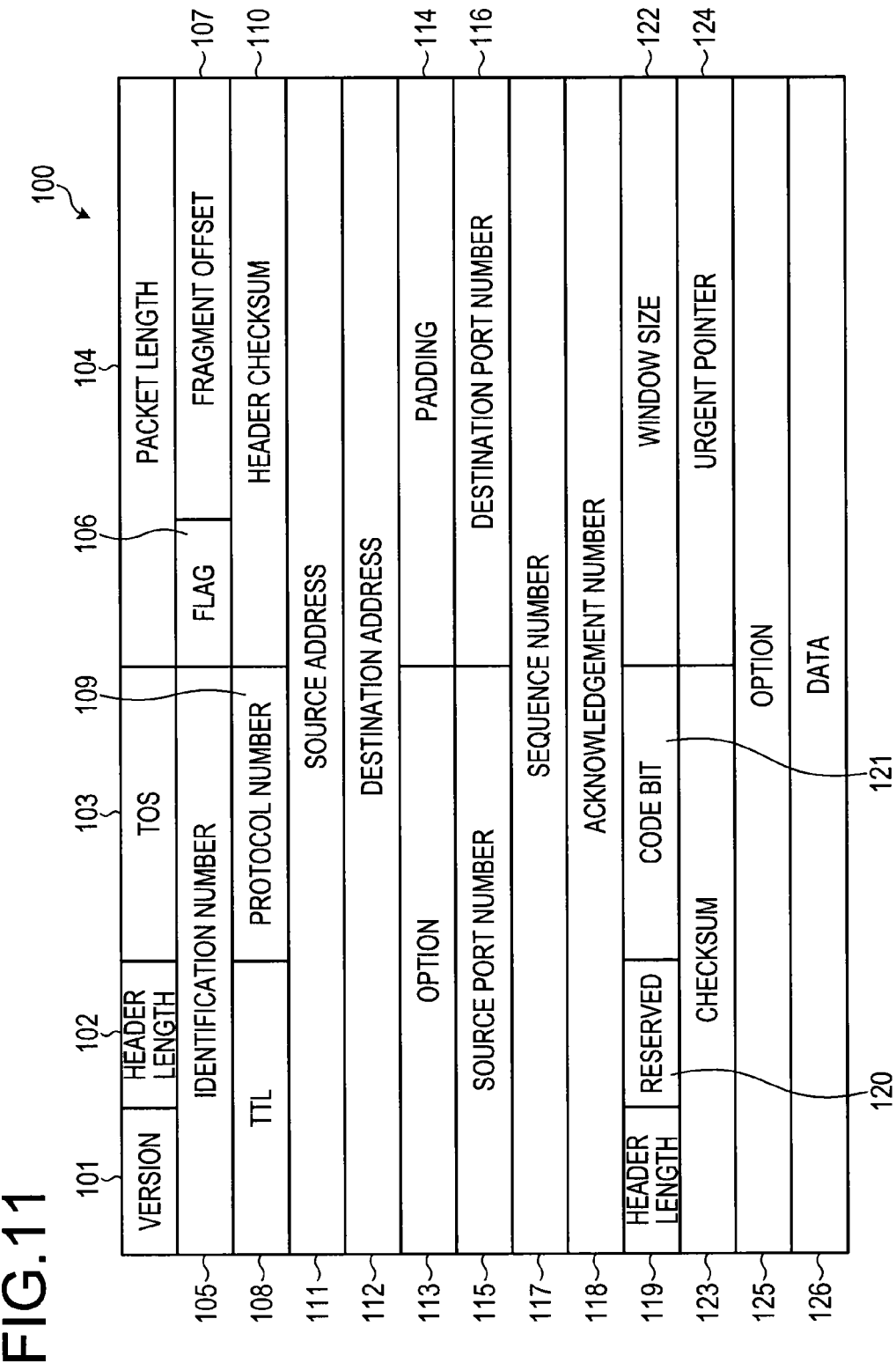
FIG. 11 is a diagram illustrating an example of a format configuration of TCP datagram.

For example, various messages exchanged between the monitoring server 6 and the first monitoring station 4, or between the monitoring server 6 and the second monitoring station 5 are transmitted in the format of TCP (Transmission Control Protocol) datagram. FIG. 11 is an explanatory view illustrating an example of the format configuration of TCP datagram. Referring to FIG. 11, the TCP datagram 100 includes a version 101, a header length 102, TOS 103, a packet length 104, an identification number 105, a flag 106, a fragment offset 107, TTL 108, and a protocol number 109. The TCP datagram 100 further includes a header checksum 110, a source address 111, a destination address 112, an option 113, a padding 114, a source port number 115, a destination port number 116, and a sequence number 117. The TCP datagram 100 further includes an acknowledgement number 118, a header length 119, reserved 120, a code bit 121, a window size 122, a checksum 123, an urgent point 124, an option 125, and data 126.

Figure 12:
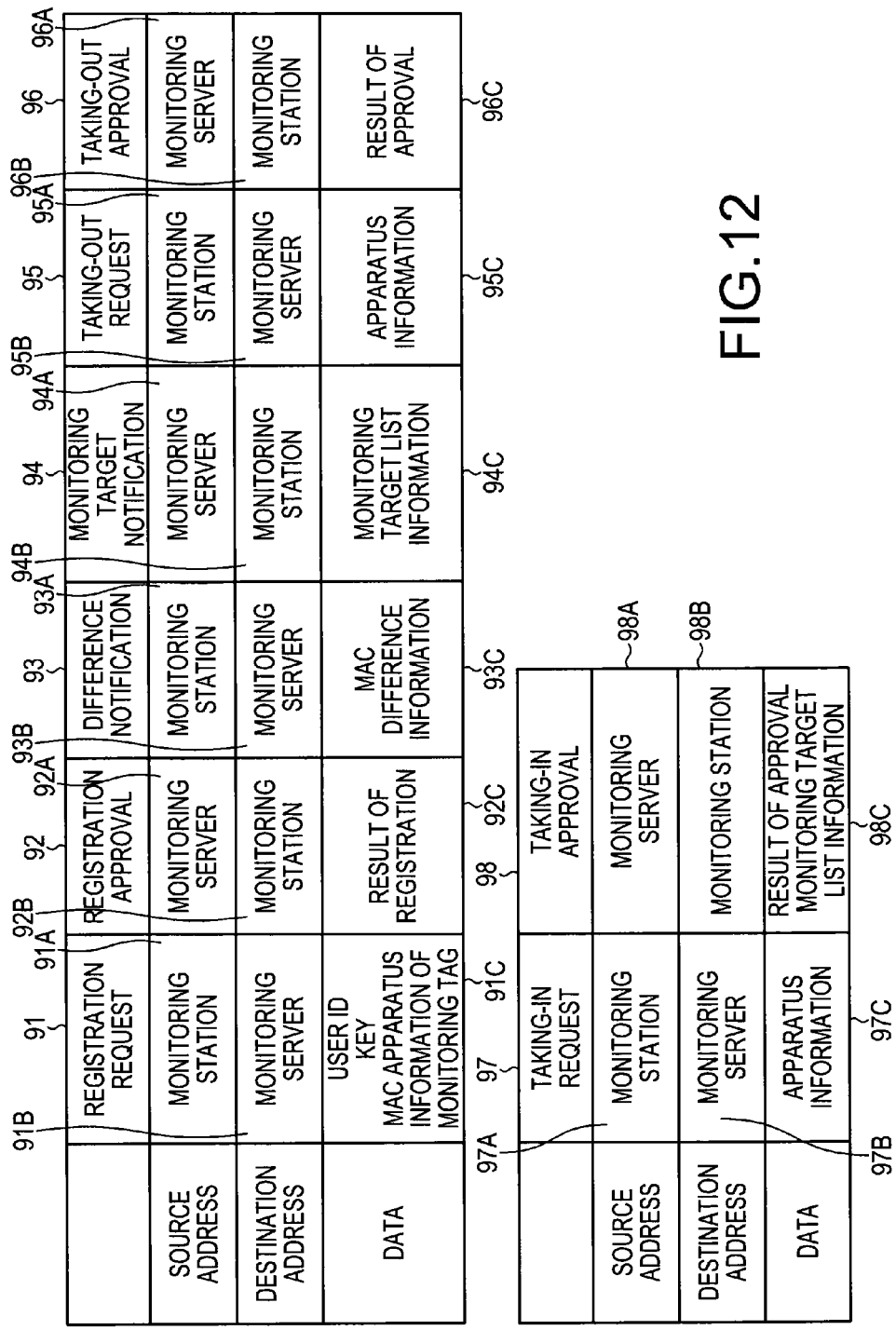
FIG. 12 is a diagram illustrating an example of a data configuration of various messages, according to an embodiment.

FIG. 12 is an explanatory view illustrating an example of the configuration (source address, destination address, and data) of various messages. Examples of the various messages may include a registration request message, a registration approval message, a difference notification message, a monitoring target notification message, a taking-out request message, a taking-out approval message, a taking-in request message, and a taking-in approval message.

The registration request message 91 is a message indicating that the second monitoring station 5 requests the monitoring server 6 to make request for registration of location monitoring of the monitoring target apparatus 2 to be registered. The IP address of the second monitoring station 5 is set in the source address 91A of the registration request message 91, and the IP address of the monitoring server 6 is set in the destination address 91B of the registration request message 91. A user ID identifying a user of registration request, a key for authentication of the user, an MAC address of the monitoring tag 3, and apparatus information of the monitoring target apparatus 2 are stored in the data 91C of the registration request message 91.

The registration approval message 92 is a message indicating that the monitoring server 6 informs the second monitoring station 5 of a result of the request of the registration request message 91. The IP address of the monitoring server 6 is set in the source address 92A of the registration approval message 92 and the IP address of the second monitoring station 5 which has transmitted the registration request message 91 is set in the destination address 92B of the registration approval message 92. An approval (successful registration) as a result of the registration request, an apparatus ID of the approved monitoring target apparatus 2, and key information are stored in the data 92C of the registration approval message 92.

The difference notification message 93 is a message indicating that the first monitoring station 4 informs the monitoring server 6 of increase/decrease of the monitoring tag 3 of the monitoring target responding to the wireless beacon. The IP address of the first monitoring station 4 is set in the source address 93A of the difference notification message 93 and the IP address of the monitoring server 6 is set in the destination address 93B of the difference notification message 93. Difference information of MAC address is stored in the data 93C of the difference notification message 93. In addition, the difference notification message 93 is also used when the second monitoring station 5 informs the monitoring server 6 of increase/decrease of the monitoring tag 3 of the monitoring target responding to the wireless beacon. In this case, the transmission source address 93A is set at the IP address of the second monitoring station 5.

The monitoring target notification message 94 is a message indicating that the monitoring server 6 informs the first monitoring station 4 of monitoring target list information including the apparatus ID of the monitoring target apparatus 2 and the MAC address of the monitoring tag 3. The IP address of the monitoring server 6 is set in the source address 94A of the monitoring target notification message 94 and the IP address of the first monitoring station 4 is set in the destination address 94B of the monitoring target notification message 94. The monitoring target list information including the apparatus ID of the monitoring target apparatus 2 and the MAC address of the monitoring tag 3 is stored in the data 94C of the monitoring target notification message 94. In addition, the monitoring target notification message 94 is also used when the second monitoring station 5 is informed of the monitoring target. In this case, the destination address 94B is set at the IP address of the second monitoring station 5.

The taking-out request message 95 is a message indicating that, when the monitoring target apparatus 2 is taken out of the radio communication range of the first NW 8A of the first monitoring station 4, the second monitoring station 5 applies to the monitoring server 6 for the monitoring target apparatus 2 to be taken out. The IP address of the second monitoring station 5 is set in the source address 95A of the taking-out request message 95, and the IP address of the monitoring server 6 is set in the destination address 95B of the taking-out request message 95. The apparatus information of the monitoring target apparatus 2 to be taken out is stored in the data 95C of the taking-out request message 95.

The taking-out approval message 96 is a message indicating that the monitoring server 6 informs the second monitoring station 5 of a result of the taking-out request. The IP address of the monitoring server 6 is set in the source address 96A of the taking-out approval message 96 and the IP address of the second monitoring station 5 is set in the destination address 96B of the taking-out approval message 96. A result of approval is stored in the data 96C of the taking-out approval message 96.

The taking-in request message 97 is a message indicating that, when the monitoring target apparatus 2 is taken in the radio communication range of the first NW 8A of the first monitoring station 4, the second monitoring station 5 applies to the monitoring server 6 for the monitoring target apparatus 2 to be taken in. The IP address of the second monitoring station 5 is set in the source address 97A of the taking-in request message 97 and the IP address of the monitoring server 6 is set in the destination address 97B of the taking-in request message 97. The apparatus information of the monitoring target apparatus 2 to be taken in is stored in the data 97C of the taking-in request message 97.

The taking-in approval message 98 is a message indicating that the monitoring server 6 informs the second monitoring station 5 of a result of the taking-in request. The IP address of the monitoring server 6 is set in the source address 98A of the taking-in approval message 98, and the IP address of the second monitoring station 5 which has transmitted the taking-in request message 97 is set in the destination address 98B of the taking-in approval message 98. A result of approval and the target list information including the apparatus ID of the monitoring target apparatus 2 and the MAC address of the monitoring tag 3 are stored in the data 98C of the taking-in approval message 98.

Figure 13:
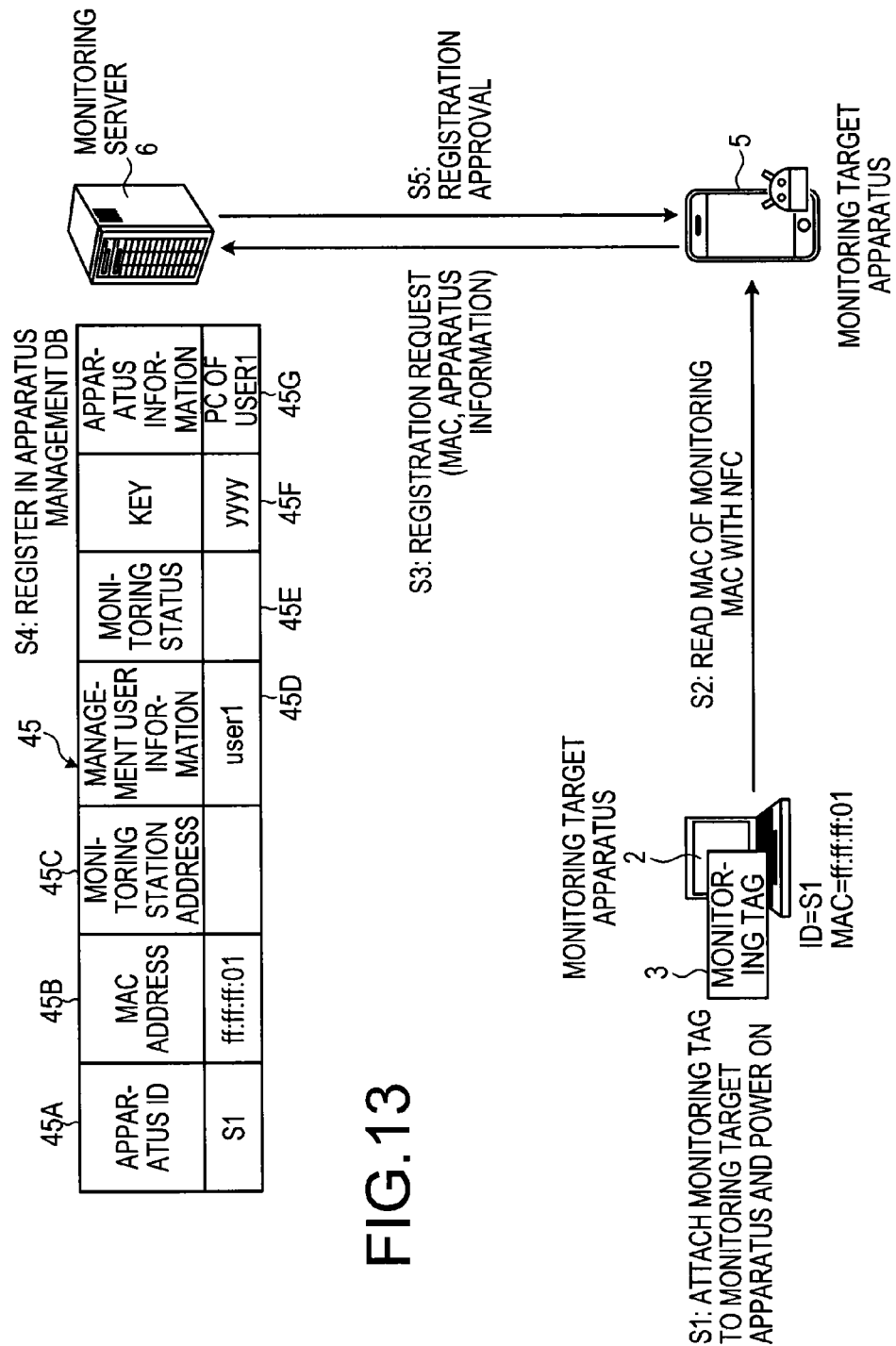
FIG. 13 is a diagram illustrating an example of an operation (for registration request) of an apparatus monitoring system, according to an embodiment.

Next, the operation of the apparatus monitoring system 1 of this embodiment will be described. FIG. 13 is an explanatory view illustrating an example of the operation (for registration request) of the apparatus monitoring system 1. For convenience of explanation, it is assumed that the ID of the monitoring target apparatus 2 is "S1" and the MAC address of the monitoring tag 3 attached to the monitoring target apparatus 2 is "ff:ff:ff:01."

First, as illustrated in FIG. 13, when the monitoring target apparatus 2 is registered in the apparatus monitoring system 1, the monitoring tag 3 is attached to the monitoring target apparatus 2 and is powered on (Step S1). It is assumed that the MAC address of the monitoring tag 3 used in, for example, the radio communication of the first NW 8A, and the apparatus ID of the monitoring target apparatus 2 are stored in the apparatus information table 66 of the monitoring tag 3. The contents of the apparatus information table 66 may be written/read by the second monitoring station 5 using NFC.

A manager or user of the monitoring target apparatus 2 starts the apparatus monitoring application 84 in the second monitoring station 5. Then, the second monitoring station 5 reads the MAC address of the monitoring tag 3 with NFC (Step S2). In addition, the second monitoring station 5 uses the apparatus monitoring application 84 to input apparatus information on the monitoring target apparatus 2 and manager information through an input screen. The second monitoring station 5 informs the monitoring server 6 of the registration request message 91 including the MAC address of the monitoring tag 3 and the apparatus information of the monitoring target apparatus 2 depending on an optional manipulation of registration request (Step S3). The manager information is, for example, a user ID, such as a name of a user of the monitoring target apparatus 2.

Upon receiving the registration request message 91 from the second monitoring station 5, the monitoring server 6 authenticates an applicant with a key in the registration request message 91. When the applicant is successfully authenticated, the monitoring server 6 registers information corresponding to the monitoring target apparatus 2 in the apparatus management DB 45, based on the MAC address of the monitoring tag 3 and the apparatus information in the registration request message 91 (Step S4). As a result, the monitoring server 6 registers the apparatus ID 45A of the monitoring target apparatus 2, the MAC address 45B of the monitoring tag 3, the management user information 45D, the key 45F, and the apparatus information 45G, in the apparatus management DB 45.

Then, after registering the information related to the monitoring target apparatus 2 in the apparatus management DB 45, the monitoring server 6 transmits the registration approval message 92 for the registration request message 91 to the second monitoring station 5 (Step S5). As a result, upon receiving the registration approval message 92 from the monitoring server 6, the second monitoring station 5 outputs a registration completion screen of the monitoring target apparatus 2 from the output unit 73. A user of the second monitoring station 5 is able to recognize the registration completion of the monitoring target apparatus 2 by looking at the registration completion screen.

In response to the registration request of the monitoring target apparatus 2 to be registered from the second monitoring station 5, the monitoring server 6 first authenticates the applicant and then registers, for example, the apparatus ID 45A of the monitoring target apparatus 2 to be registered, the MAC address 45B of the monitoring tag 3 of the monitoring target apparatus 2, in the apparatus management DB 45 of the monitoring server 6. As a result, the user is able to register the monitoring target apparatus 2 with simple registration request from the second monitoring station 5.

Figure 14:
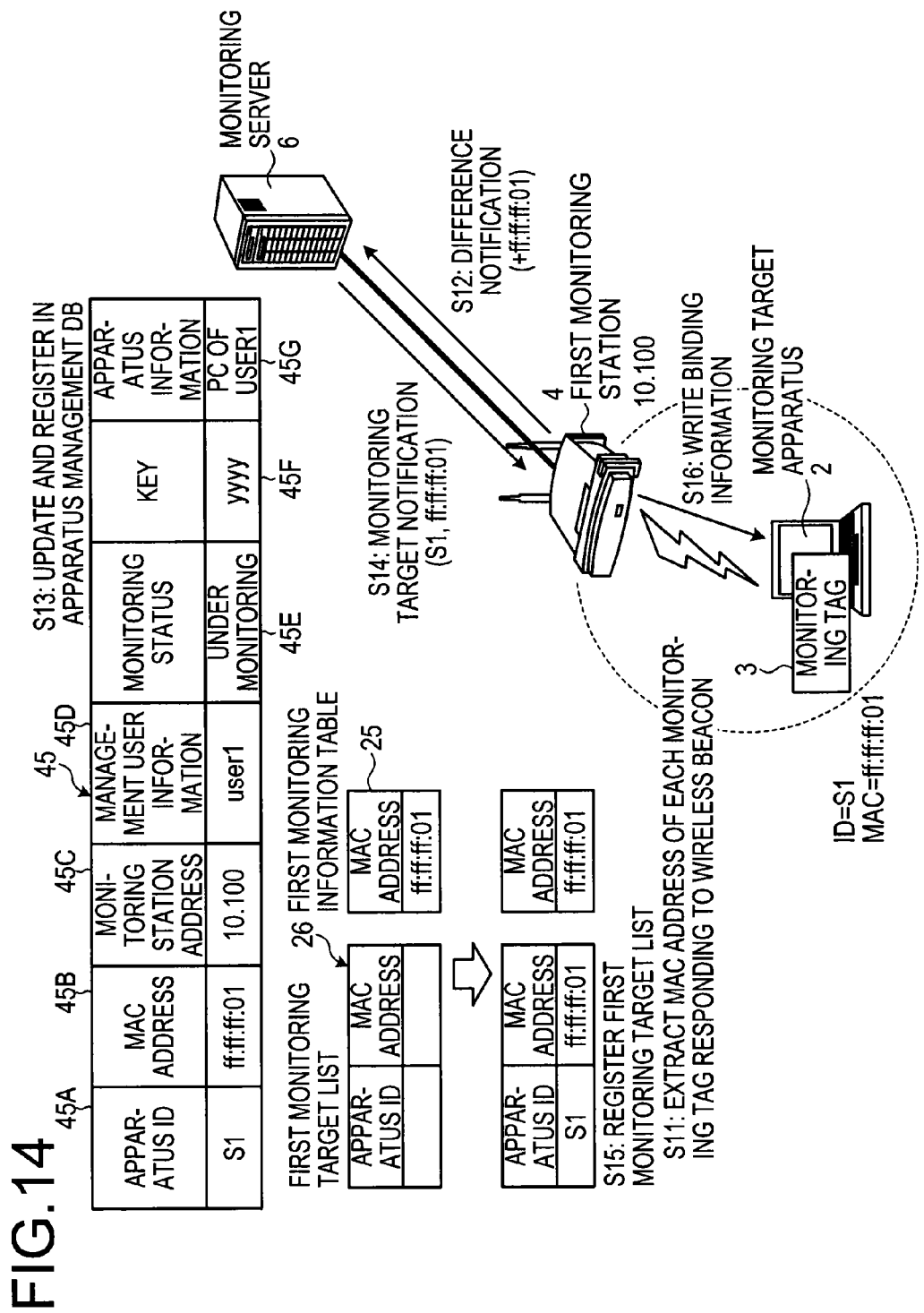
FIG. 14 is a diagram illustrating an example of an operation (for monitoring by a first monitoring station) of an apparatus monitoring system, according to an embodiment.

FIG. 14 is an explanatory view illustrating an example of the operation (for monitoring by the first monitoring station 4) of the apparatus monitoring system 1. It is here assumed that the IP address of the first monitoring station 4 is 10.100. The first monitoring station 4 illustrated in FIG. 14 regularly transmits a wireless beacon in the first NW 8A. According to a response of the monitoring tag 3 to the wireless beacon, the first monitoring station 4 extracts the MAC address of the monitoring tag 3 (Step S11).

The first monitoring station 4 registers a list of MAC addresses of the monitoring tag 3 in the first monitoring information table 25. In the example of FIG. 14, the number of monitoring tags 3 responding to the wireless beacon of the first monitoring station 4 is one and the MAC address of the monitoring tag 3 is "ff:ff:ff:01." The first monitoring station 4 compares the monitoring target MAC address registered in the first monitoring target list 26 with the MAC address registered in the first monitoring information table 25. In the example of FIG. 14, it is assumed that the MAC address "ff:ff:ff:01" is not registered in the first monitoring target list 26. Since the MAC address (ff:ff:ff:01) is newly detected, the first monitoring station 4 informs the monitoring server 6 of the difference notification message 93 including "additional" difference information (Step S12). The "additional" difference information is represented by "+ff:ff:ff:01" with "additional" indicated by "+."

Upon receiving the difference notification message 93, the monitoring server 6 searches entries in the apparatus management DB 45 for the MAC address of the monitoring tag 3 notified as the difference information in the difference notification message 93. When an entry corresponding to the MAC address of the difference information is searched, the monitoring server 6 registers the IP address of the first monitoring station 4, which is the source address of the difference notification message 93, in the monitoring station address 45C of the entry. In addition, the monitoring server 6 sets the monitoring status 45E of the entry at "under monitoring." That is, the monitoring server 6 updates and registers the entry in the apparatus management DB 45 related to the MAC address of the monitoring tag 3 of the difference notification message 93 (Step S13).

After the updating and registration of the apparatus management DB 45, the monitoring server 6 informs the first monitoring station 4 of the monitoring target notification message 94 including the MAC address (ff:ff:ff:01) of the monitoring tag 3 and the apparatus ID (S1) of the monitoring target apparatus 2 attached with the monitoring tag 3 (Step S14).

Upon receiving the monitoring target notification message 94, the first monitoring station 4 registers the apparatus ID (S1) and the MAC address (ff:ff:ff:01) in the monitoring target notification message 94 into the first monitoring target list 26 (Step S15). After the first monitoring station 4 registers the apparatus ID and the MAC address of the monitoring target in the first monitoring target list 26, although the MAC address of the monitoring tag 3 of the monitoring target is detected with the wireless beacon, no operation is caused by the MAC address. Then, for the monitoring tag 3, the first monitoring station 4 writes the MAC address of the first monitoring station 4, as associated information (binding information), in the tag side monitoring information table 65 (Step S16). As a result, the monitoring tag 3 is able to detect communication disconnection (binding off) of the wireless beacon from the first monitoring station 4 which is monitoring the monitoring tag 3.

The first monitoring station 4 monitors the location of the monitoring target apparatus 2, based on the extraction of the MAC address of the monitoring tag 3 depending on the presence of a response of the wireless beacon to the monitoring tag 3 of the monitoring target. In addition, the first monitoring station 4 compares the MAC address of the monitoring target in the first monitoring target list 26 with the currently extracted MAC address in the first monitoring information table 25 and informs the monitoring server 6 of the difference information, such as addition and loss of the MAC address. As a result, since information transmitted by the first monitoring station 4 to the monitoring server 6 is the difference information, the amount of data to be transmitted may be decreased accordingly.

The monitoring server 6 recognizes the monitoring station address and monitoring status of the monitoring target, from the difference notification message 93 received from the first monitoring station 4, and updates and registers the monitoring station address 45C and monitoring status 45E in the apparatus management DB 45 corresponding to the monitoring target apparatus 2. As a result, the monitoring server 6 may recognize the MAC address 45B, monitoring station address 45C, management user information 45D, and monitoring status 45E of the monitoring tag 3 of the monitoring target apparatus 2 by referring to the apparatus management DB 45. Then, the monitoring server 6 is able to monitor the location of the monitoring target apparatus 2 for which the first monitoring station 4 is responsible.

Figure 15:
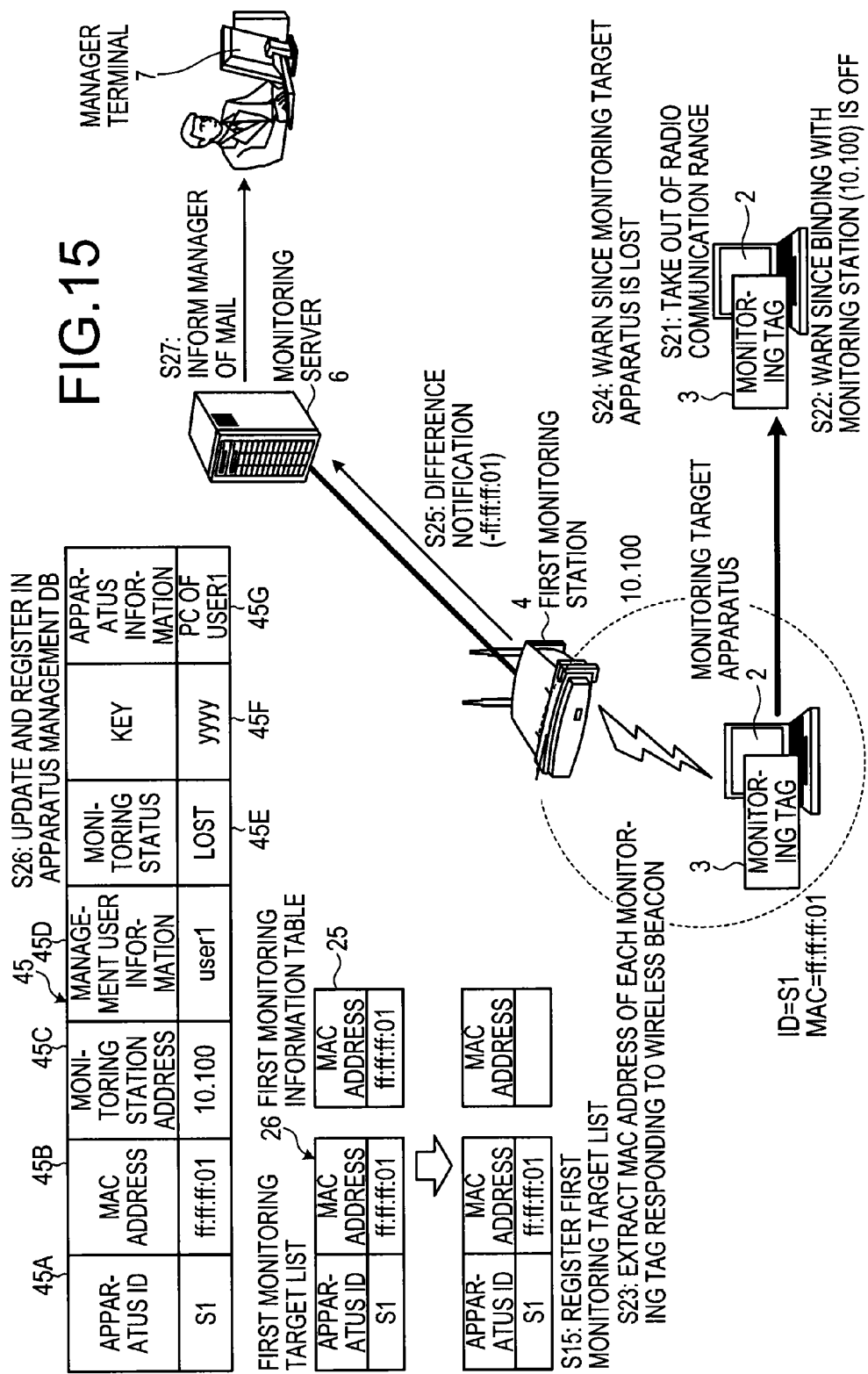
FIG. 15 is a diagram illustrating an example of an operation (for monitoring by a first monitoring station) of an apparatus monitoring system, according to an embodiment.

FIG. 15 is an explanatory view illustrating an example of the operation (for monitoring by the first monitoring station 4) of the apparatus monitoring system 1. For example, it is assumed that a user takes the monitoring target apparatus 2 out of the radio communication range of the first NW 8A of the first monitoring station 4 without any taking-out request (Step S21). The monitoring tag 3 of the monitoring target apparatus 2 detects radio communication disconnection (binding off) of the wireless beacon from the first monitoring station 4 and outputs a warning from the output unit 52 (Step S22). The output unit 52 may inform persons around the monitoring target apparatus 2 of loss of the monitoring target apparatus 2 by outputting a warning, such as LED lighting or warning sounding.

Since the monitoring tag 3 of the monitoring target apparatus 2 has no response to the wireless beacon which is regularly transmitted within the radio communication range of the first NW 8A, the first monitoring station 4 detects the loss of the monitoring target apparatus 2 (Step S23). The first monitoring station 4 outputs a warning of loss of the monitoring target apparatus 2 via the output unit 12 (Step S24). In addition, even when the monitoring tag 3 is powered off, the output unit 12 of the first monitoring station 4 outputs the warning, such as LED lighting or warning sounding, thereby informing persons around the first monitoring station 4 of loss of the monitoring target apparatus 2.

The first monitoring station 4 recognizes loss of the MAC address (ff:ff:ff:01) by comparing the MAC address in the first monitoring target list 26 with the MAC address in the first monitoring information table 25. Then, the first monitoring station 4 transmits the difference notification message 93 to the monitoring server 6 (Step S25) and informs the monitoring server 6 of "lost" of the MAC address (ff:ff:ff:01). Since the difference information of the difference notification message 93 corresponds to the "lost" difference information, the difference information is represented by "—ff:ff:ff:01" with "additional" indicated by "—."

Upon receiving the difference notification message, the monitoring server 6 searches the entry in the apparatus management DB 45 for the MAC address (ff:ff:ff:01) of "lost" in the difference notification message 93, and sets the monitoring status 45E of the entry obtained by the search at "lost" (Step S26).

Upon detecting "lost" of the monitoring target apparatus 2 after the updating and registration of the apparatus management DB 45, the monitoring server 6 transmits a report mail of a loss warning to the manager terminal 7 (Step S27). As a result, it is possible to prevent an escalation of accident report to a manager from being delayed due to hesitation of a party who caused the loss accident.

When the apparatus for which the monitoring tag 3 of the monitoring target apparatus 2 is responsible is out of the radio communication range of the first monitoring station 4 which is monitoring the apparatus, the monitoring tag 3 determines that the radio communication by the wireless beacon is disconnected since the monitoring tag 3 fails to extract the MAC address of the first monitoring station 4 which corresponds to the transmission source address of the wireless beacon from the first monitoring station 4. Upon detecting the radio communication disconnection of the wireless beacon, the monitoring tag 3 outputs a warning. As a result, when the warning output is warning sounding, the monitoring tag 3 is able to inform persons around the monitoring target apparatus 2 attached with the monitoring tag 3 of the loss of the monitoring target apparatus 2.

When there is no response to the wireless beacon from the monitoring tag 3 of the monitoring target apparatus 2 which is being currently monitored, for example, the first monitoring station 4 transmits a warning mail of the loss of the monitoring target apparatus 2 to the manager terminal 7. As a result, since, for example, a manager is able to recognize the loss of the monitoring target apparatus 2 being monitored by the first monitoring station 4 by reading the warning mail, the manager is able to promptly cope with the apparatus loss. The manager, for example, is able to recognize the loss of the monitoring target apparatus 2 even when the warning sound is not output as the monitoring tag 3 is powered off. In addition, although it has been illustrated that the first monitoring station 4 transmits the warning mail to the manager terminal 7, the first monitoring station 4 may output the warning sound to inform persons around the first monitoring station 4 of the loss of the monitoring target apparatus 2.

In addition, since the first monitoring station 4 informs the monitoring server 6 of the difference information of the loss of the monitoring target apparatus 2, the first monitoring station 4 updates and registers "lost," as the monitoring status 45E of the monitoring target apparatus 2, in the apparatus management DB 45. As a result, the monitoring server 6 is able to recognize the "lost" of the monitoring target apparatus by referring to the apparatus management DB 45.

The logic for generation of the loss warning may be devised and the warning may be suspended by the monitoring status 45E set in the apparatus management DB 45. For example, in a case where an office has a plurality of floors and the monitoring target apparatus 2 is taken into a separate floor for conference, making taking-out request each time may be unbeneficial to convenience. Therefore, the postponement time 45H is set and no warning issues when the monitoring tag 3 of the monitoring target apparatus 2 is able to be detected by any monitoring station in the postponement time. In this case, it is assumed that the monitoring status 45E of the apparatus management DB 45 is updated and registered with "under holding."

Figure 16:
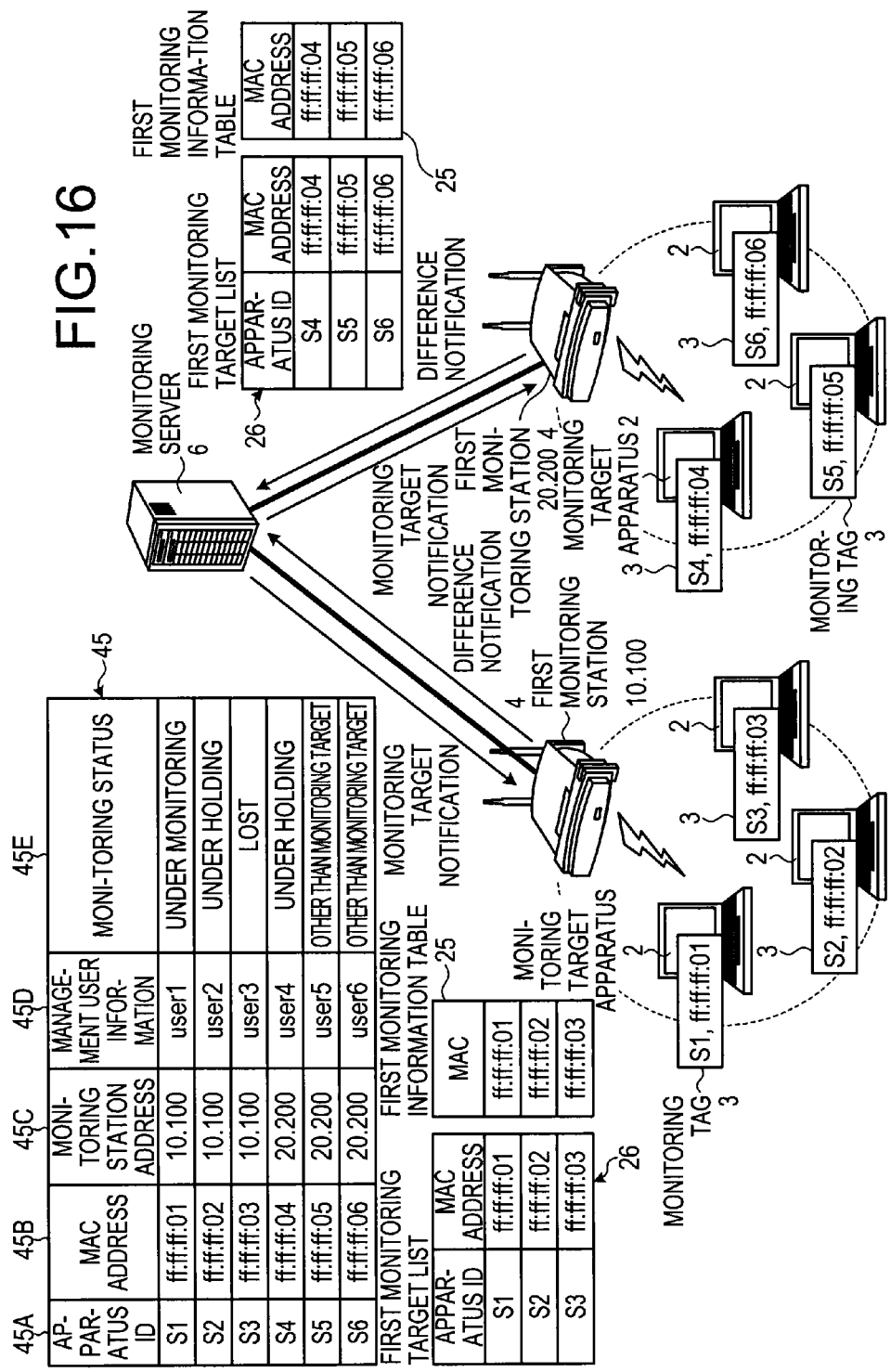
FIG. 16 is a diagram illustrating an example of a normal operation of an apparatus monitoring system, according to an embodiment.

FIG. 16 is an explanatory view illustrating an example of the normal operation of the apparatus monitoring system 1. The first monitoring station 4 of the IP address "10.100" monitors locations of three monitoring target apparatuses (with apparatus IDs: S1, S2 and S3) 2. The first monitoring station 4 of the IP address "20.200" monitors locations of three monitoring target apparatuses (with apparatus IDs: S4, S5 and S6) 2.

The monitoring server 6 updates and registers the apparatus management DB 45 with the difference information of the difference notification message 93 from the first monitoring station 4 of the IP address "10.100." Then, the monitoring server 6 transmits the monitoring target notification message 94 including the apparatus IDs (S1, S2 and S3) of the monitoring target apparatuses 2 and the MAC addresses of the monitoring tags 3 to the first monitoring station 4 of the IP address "10.100." Then, the first monitoring station 4 of the IP address "10.100" updates and registers the apparatus IDs of the monitoring target apparatuses 2 and the MAC addresses of the monitoring tags 3 in the monitoring target notification message 94, in the first monitoring target list 26.

The monitoring server 6 updates and registers the apparatus management DB 45 with the difference notification message 93 from the first monitoring station 4 of the IP address "20.200." Then, the monitoring server 6 transmits the monitoring target notification message 94 including the apparatus IDs (S4, S5 and S6) of the monitoring target apparatuses 2 and the MAC addresses of the monitoring tags 3 to the first monitoring station 4 of the IP address "20.200." Then, the first monitoring station 4 of the IP address "20.200" updates and registers the apparatus IDs of the monitoring target apparatuses 2 and the MAC addresses of the monitoring tags 3 in the monitoring target notification message 94, in the first monitoring target list 26.

The monitoring server 6 is able to monitor the status of each monitoring target apparatus 2 of each monitoring tag 3 responding to the wireless beacon within the radio communication range within each first monitoring station 4 by referring to the apparatus management DB 45. The monitoring server 6 is able to recognize the MAC address 45B, monitoring station address 45C, management user information 45D, monitoring status 45E, key 45F, and apparatus information 45G of the monitoring tag 3 for each monitoring target apparatus 2, by referring to the apparatus management DB 45.

Figure 17:
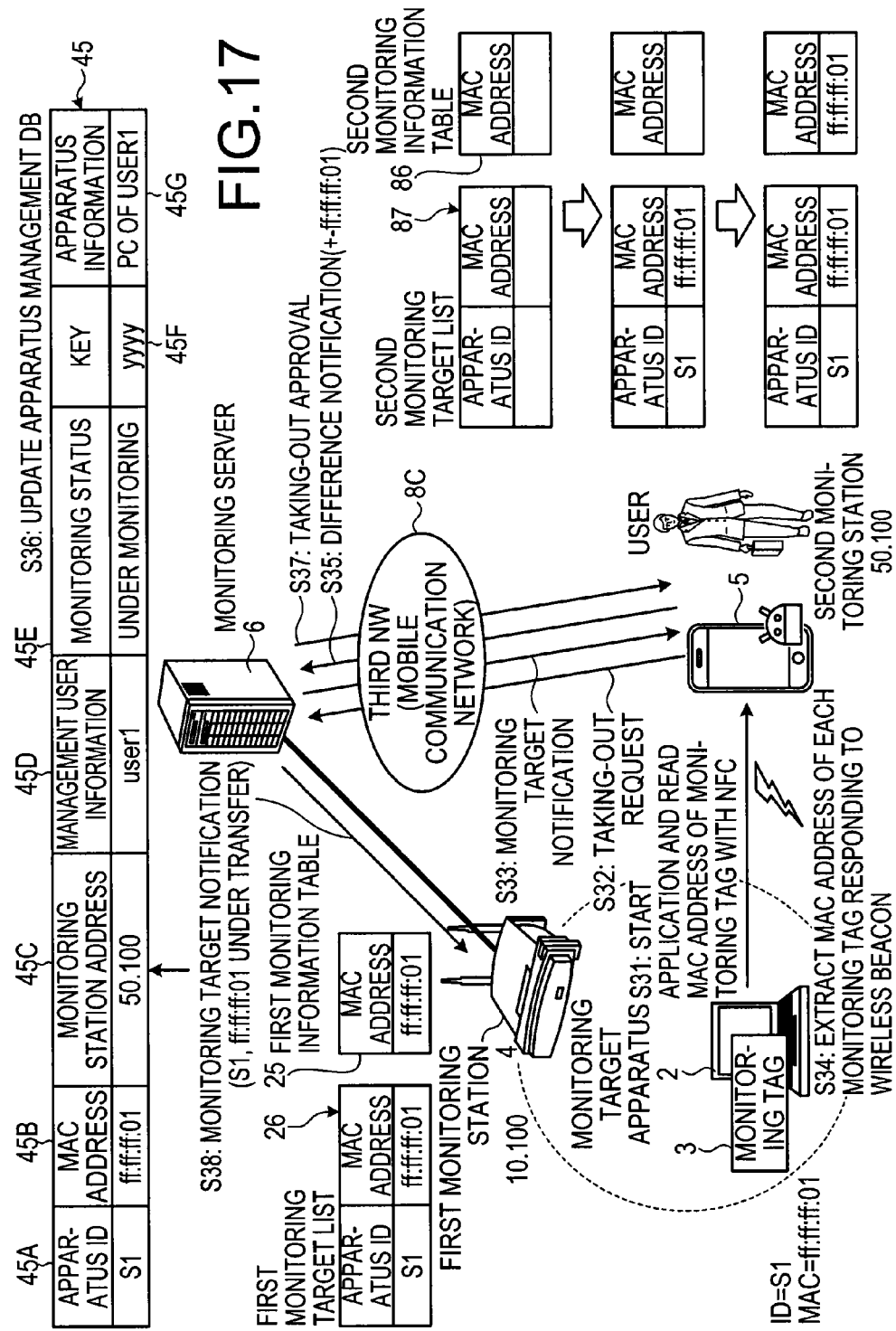
FIG. 17 is a diagram illustrating an example of an operation (for taking-out request) of an apparatus monitoring system, according to an embodiment.

FIG. 17 is an explanatory view illustrating an example of the operation (for taking-out request) of the apparatus monitoring system 1. For example, when a user takes the monitoring target apparatus 2 out of the radio communication range of the first NW 8A of the first monitoring station 4, for example, out of an office, the user starts the apparatus monitoring application 84 of the second monitoring station 5 (Step S31).

After the apparatus monitoring application 84 is started, the second monitoring station 5 detects a manipulation of selecting the taking-out request and reads information, such as the MAC address of the monitoring tag 3 attached to the monitoring target apparatus 2 to be taken out and the apparatus ID of the monitoring target apparatus 2, with NFC. In addition, the second monitoring station 5 transmits the taking-out request message 95, which includes the apparatus ID of the monitoring target apparatus 2 to be taken out and the MAC address of the monitoring tag 3 attached to the monitoring target apparatus 2, to the monitoring server 6 (Step S32). In addition, the second monitoring station 5 communicates with the monitoring server 6 via the second NW 8B connected to the third NW 8C.

Upon receiving the taking-out request message 95, the monitoring server 6 transmits the monitoring target notification message 94, which includes the apparatus ID of the monitoring target apparatus 2 to be taken out and the MAC address of the monitoring tag 3, to the second monitoring station 5 which has transmitted the taking-out request message 95 (Step S33). Upon receiving the monitoring target notification message 94, the second monitoring stations 5 registers the apparatus ID of the monitoring target apparatus 2 to be taken out and the MAC address of the monitoring tag 3 in the monitoring target notification message 94, in the second monitoring target list 87. Then, the second monitoring station 5 starts transmission of the wireless beacon within the radio communication range of the first NW 8A and extracts the MAC address of the monitoring tag 3 responding to the wireless beacon (Step S34).

Unlike the first monitoring station 4, the second monitoring station 5 monitors only the MAC address of a particular monitoring tag 3 of a designated monitoring target. Therefore, the second monitoring station 5 transmits only the difference information related to the MAC address registered in the second monitoring target list 87, as a difference notification message, to the monitoring server 6 (Step S35). In addition, even when there is no difference for the MAC address of the monitoring tag 3 of the monitoring target, the second monitoring station 5 transmits the difference notification message 93 including the difference information of no difference to the monitoring server 6. This is because the third NW 8C (a mobile communication network) is used and, therefore, connection between the second monitoring station 5 and the monitoring server 6 is not always guaranteed, and no notification does not necessarily mean a loss of the designated monitoring target since communication may be disconnected due to movement of the second monitoring station 5.

Upon receiving the difference notification message 93 after receiving the taking-out request message 95, the monitoring server 6 checks the monitoring start of the monitoring target apparatus 2 by the second monitoring station 5. After checking the monitoring start of the monitoring target apparatus 2 by the second monitoring station 5, the monitoring server 6 changes the monitoring station address 45C in the corresponding entry of the apparatus management DB 45 to the IP address of the second monitoring station 5 which has transmitted the taking-out request message 95. Then, the monitoring server 6 updates and registers the apparatus management DB 45 (Step S36).

After updating and registering the apparatus management DB 45, the monitoring server 6 transmits the taking-out approval message 96 to the second monitoring station 5 (Step S37). As a result, after receiving the taking-out approval message 96, the second monitoring station 5 displays a screen illustrating that the monitoring target apparatus 2 is allowed to be taken out.

In addition, the monitoring server 6 transmits the monitoring target notification message 94, which includes the apparatus ID of the monitoring target apparatus 2 to be taken out, the MAC address of the monitoring tag 3, and the monitoring status of "under transfer," to the first monitoring station 4 (Step S38). As a result, the first monitoring station 4 recognizes the "under transfer" of the monitoring target apparatus 2 to a different monitoring station.

The second monitoring station 5 designates a monitoring target apparatus 2 to be taken out, with a manipulation for request, and informs the monitoring server 6 of the taking-out request including the apparatus ID of the designated monitoring target apparatus 2 and the MAC address of the monitoring tag 3. This allows the user to simply apply to the monitoring server 6 for the monitoring target apparatus 2 to be taken out by using the second monitoring station 5.

Upon detecting the taking-out request from the second monitoring station 5, the monitoring server 6 updates and registers the IP address of the second monitoring station 5 with the monitoring station address 45C of the monitoring target apparatus 2 to be taken out in the apparatus management DB 45. As a result, the monitoring server 6 is able to transfer the monitoring target apparatus 2 to be taken out to the second monitoring station 5 which is a taking-out destination.

In addition, upon detecting the taking-out request from the second monitoring station 5 after updating and registering the apparatus management DB 45, the monitoring server 6 informs the second monitoring station 5 of taking-out approval. Upon detecting the taking-out approval, the second monitoring station 5 displays approval for the taking-out request. As a result, the user is able to recognize the approval for request for taking-out of the monitoring target apparatus 2 and take the monitoring target apparatus 2 out of the radio communication range of the first monitoring station 4, for example, out of an office.

In other words, the monitoring server 6 takes over the location monitoring of the monitoring target apparatus 2, which is being monitored by the first monitoring station 4, from the first monitoring station 4 to the second monitoring station 5, with a simple manipulation from the second monitoring station 5, and the second monitoring station 5 collects results of monitoring of the monitoring target apparatus 2. As a result, even when the monitoring target apparatus 2 is taken out of the monitoring range of the first monitoring station 4, the second monitoring station 5 is able to continue to monitor the location of the monitoring target apparatus 2.

Figure 18:
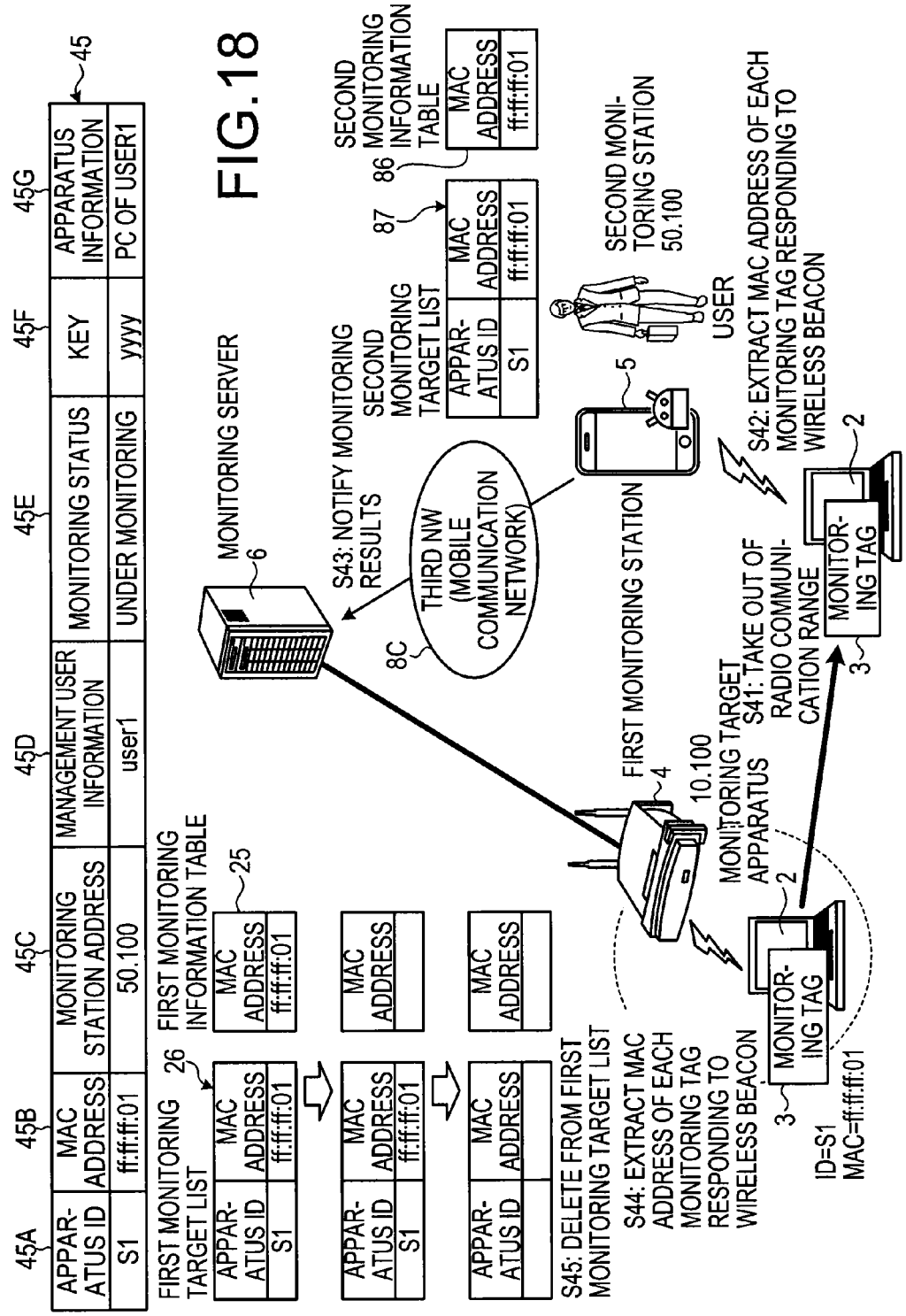
FIG. 18 is a diagram illustrating an example of an operation (for monitoring by a second monitoring station) of an apparatus monitoring system, according to an embodiment.

FIG. 18 is an explanatory view illustrating an example of the operation (for monitoring by the second monitoring station 5) of the apparatus monitoring system 1. When the taking-out is approved in the apparatus monitoring application 84, the user is able to take the monitoring target apparatus 2 out of the radio communication range of the first NW 8A covered by the first monitoring station 4, with no warning (Step S41).

The second monitoring station 5 regularly transmits the wireless beacon into the radio communication range of the first NW 8A via the wireless IF unit 71A and continues the location monitoring of the monitoring target apparatus 2 in place of the first monitoring station 4 (Step S42). The second monitoring station 5 transmits the difference notification message 93 for the monitoring target apparatus 2 to the monitoring server 6 at a predetermined timing (Step S43). Even when there is no difference, the second monitoring station 5 performs the difference notification. In this case, communication costs of the third NW 8C may be saved by decreasing the frequency of notification of no difference.

Before taking-out of the monitoring target apparatus 2, the first monitoring station 4 can detect "lost" of the monitoring target apparatus 2 from the radio communication range of the first monitoring station 4 since the monitoring tag 3 makes no response to the regularly transmitted wireless beacon (Step S44). As a result, since the first monitoring station 4 has been informed of "under transfer" of the monitoring target apparatus 2, the first monitoring station 4 deletes the corresponding entry of the monitoring target from the first monitoring target list 26 without notifying the monitoring server 6 and ends the monitoring of the monitoring tag 3 (Step S45).

The monitoring server 6 recognizes the monitoring station address 45C and monitoring status 45E of the monitoring target apparatus 2 from the MAC address of the difference information from the second monitoring station 5, and updates and registers the monitoring station address 45C and monitoring status 45E in the apparatus management DB 45 corresponding to the monitoring target apparatus 2. This allows the monitoring server 6 to recognize the MAC address 45B, monitoring station address 45C, management user information 45D, and monitoring status 45E of the monitoring tag 3 of the monitoring target apparatus 2 by referring to the apparatus management DB 45.

When the monitoring tag 3 of the monitoring target apparatus 2 is out of the radio communication range of the second monitoring station which is monitoring the apparatus attached with the monitoring tag 3, the monitoring tag 3 determines this as radio communication disconnection of the wireless beacon since the monitoring tag 3 fails to extract the IP address of the second monitoring station 5 which is the transmission source IP address of the wireless beacon from the second monitoring station 5. Upon detecting the radio communication disconnection of the wireless beacon, the monitoring tag 3 outputs a warning. As a result, when the warning output is warning sounding, the monitoring tag 3 is able to inform persons around the monitoring target apparatus 2 attached with the monitoring tag 3 of the loss of the monitoring target apparatus 2 with the warning sounding.

In addition, when there is no response to the wireless beacon from the monitoring tag 3 of the monitoring target apparatus 2 which is currently being monitored, the second monitoring station 5 may inform, for example, the manager terminal 7 of a warning mail of the loss of the monitoring target apparatus 2. As a result, since a manager, for example, is able to recognize the loss of the monitoring target apparatus 2 being monitored by the second monitoring station 5 by reading the warning mail, the manager is able to promptly cope with the apparatus loss. The manager, for example, is able to recognize the loss of the monitoring target apparatus 2 even when the warning sound is unable to be output as the monitoring tag 3 is powered off. In addition, although it has been illustrated that the second monitoring station 4 informs the manager terminal 7 of the warning mail, the second monitoring station 5 may output the warning sound to inform persons around the second monitoring station 5 of the loss of the monitoring target apparatus 2.

In addition, since the second monitoring station 5 informs the monitoring server 6 of the difference information of "lost" of the monitoring target apparatus 2, the second monitoring station 5 updates and registers "lost," as the monitoring status 45E of the monitoring target apparatus 2, in the apparatus management DB 45. This allows the monitoring server 6 to recognize the "lost" of the monitoring target apparatus by referring to the apparatus management DB 45.

Figure 19:
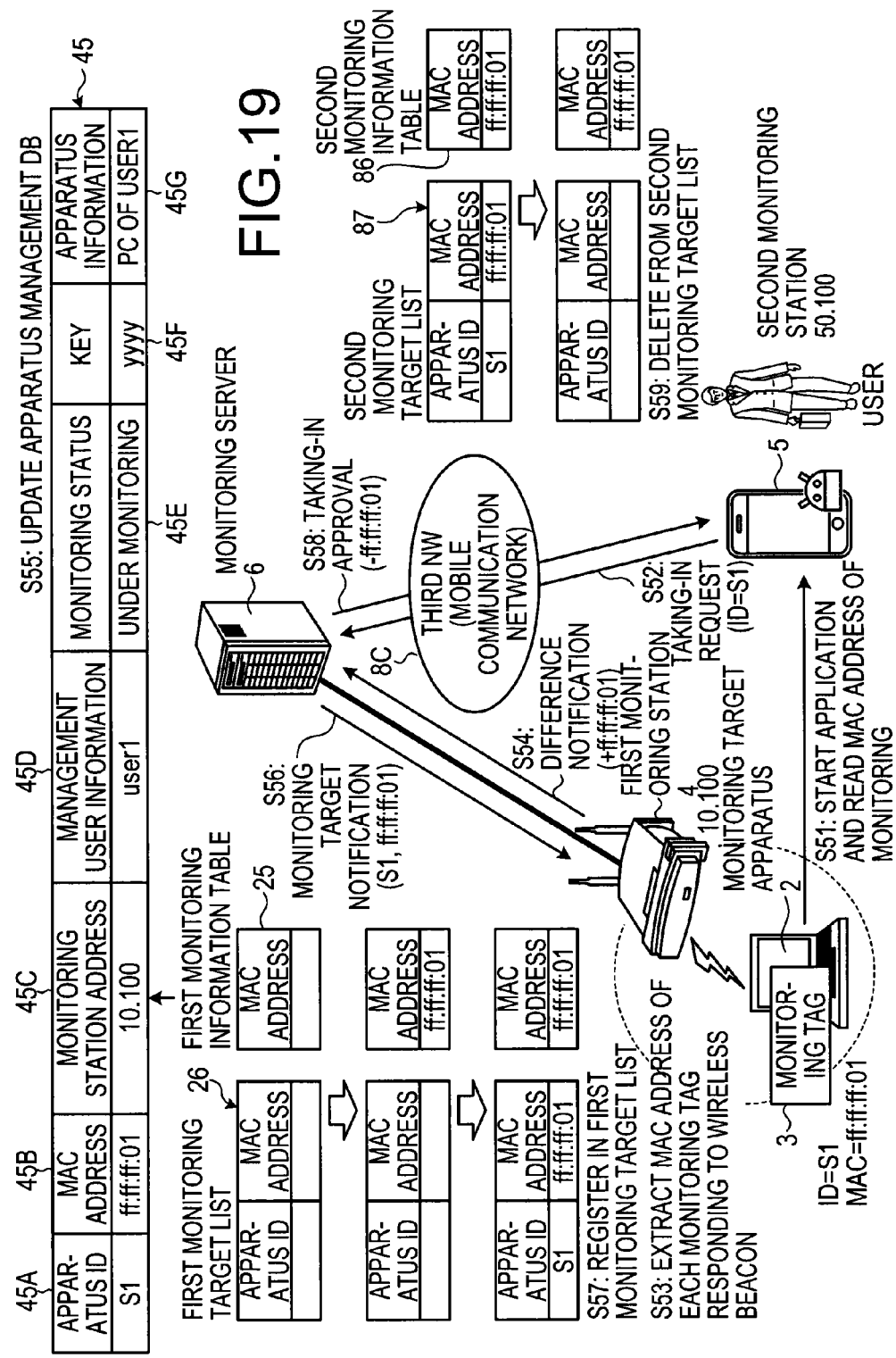
FIG. 19 is a diagram illustrating an example of an operation (for taking-in request) of an apparatus monitoring system, according to an embodiment.

FIG. 19 is an explanatory view illustrating an example of the operation (for taking-in request) of the apparatus monitoring system 1. The second monitoring station 5 starts the apparatus monitoring application 84 and reads the MAC address of the monitoring tag 3 attached to the monitoring target apparatus 2 to be taken in, with NFC (Step S51).

Upon detecting an optional manipulation of registration request through the apparatus monitoring application 84, the second monitoring station 5 specifies the monitoring tag 3 from the MAC address read with NFC and transmits the taking-in request message 97 to the monitoring server 6 (Step S52). The taking-in request message 97 includes the apparatus ID of the monitoring target apparatus 2 attached with the monitoring tag 3. Since the monitoring tag 3 of the taken-in monitoring target apparatus 2 replies to the wireless beacon, the first monitoring station 4 responsible for the radio communication range into which the monitoring target tag 3 is taken detects entrance of the monitoring target apparatus 2 into the radio communication range by extracting the MAC address of the monitoring tag 3 that has replied (Step S53).

Since the MAC address (ff:ff:ff:01) of the monitoring tag 3 of the entered monitoring target apparatus 2 is not present in the first monitoring target list 26 and is not to be monitored, the first monitoring station 4 transmits the difference notification message 93 of addition of the MAC address to the monitoring server 6 (Step S54).

Upon receiving the difference notification message 93, the monitoring server 6 searches the entries in the apparatus management DB 45 for the "additional" MAC address in the difference notification message 93. The monitoring server 6 updates the apparatus management DB 45 by changing the monitoring station address 45C of the entry to the IP address of the first monitoring station 4 which is the transmission source IP address of the difference notification message 93 (Step S55). The monitoring server 6 transmits the monitoring target notification message 94, which includes the MAC address of the monitoring tag 3 and the apparatus ID of the monitoring target apparatus 2, to the first monitoring station 4 (Step S56).

The first monitoring station 4 registers the MAC address of the monitoring tag 3 and the apparatus ID of the monitoring target apparatus 2 in the monitoring target notification message 94, in the first monitoring target list 26 (Step S57), and monitors the location of the monitoring target apparatus 2 attached with the monitoring tag 3 with the wireless beacon.

In addition, the monitoring server 6 checks the update of entry of the monitoring station address 45C of the monitoring target of the taking-in request message 97 by referring to the apparatus management DB 45. Then, after checking the update of entry, the monitoring server 6 transmits the taking-in approval message 98 to the second monitoring station 5 which has transmitted the taking-in request message 97 (Step S58).

Upon receiving the taking-in approval message through the apparatus monitoring application 84, the second monitoring station 5 deletes the apparatus ID of the monitoring target apparatus 2 approved to be taken in and the MAC address of the monitoring tag 3, from the second monitoring target list 87 (Step S59). As a result, the monitoring target apparatus 2 is determined to be completely transferred from the second monitoring station 5 to the first monitoring station 4.

The second monitoring station 5 designates a monitoring target apparatus 2 to be taken in with a manipulation for request, and informs the monitoring server 6 of the taking-in request including the apparatus ID of the designated monitoring target apparatus 2 and the MAC address of the monitoring tag 3. This allows the user to simply apply to the monitoring server 6 for the monitoring target apparatus 2 to be taken out by using the second monitoring station 5.

Upon detecting the taking-in request from the second monitoring station 5, the monitoring server 6 updates and registers the monitoring station address 45C of the monitoring target apparatus 2 in the apparatus management DB 45 with the IP address of the first monitoring station 4 of the taking-in destination. This allows the monitoring server 6 to transfer the monitoring target apparatus 2 to be taken in, to the first monitoring station 4 which is the taking-in destination.

In addition, upon detecting the taking-in request from the second monitoring station 5 after updating and registering the apparatus management DB 45, the monitoring server 6 informs the second monitoring station 5 of taking-in approval. Upon detecting the taking-in approval, the second monitoring station 5 displays approval for the taking-in request. As a result, the user is able to recognize the approval for request for taking-in of the monitoring target apparatus 2, and take the monitoring target apparatus 2 into the radio communication range of the first monitoring station 4 which is the taking-in destination.

In other words, the monitoring server 6 takes over the location monitoring of the monitoring target apparatus 2, which is being monitored by the second monitoring station 5, from the second monitoring station 5 to the first monitoring station 4 which is the taking-in destination, with a simple manipulation from the second monitoring station 5, and the first monitoring station 4 collects results of monitoring of the monitoring target apparatus 2. As a result, when the monitoring target apparatus 2 is taken from the second monitoring station 5 into the first monitoring station 4, the monitoring of the location of the monitoring target apparatus 2 is continued by the first monitoring station 4.

Figure 20:
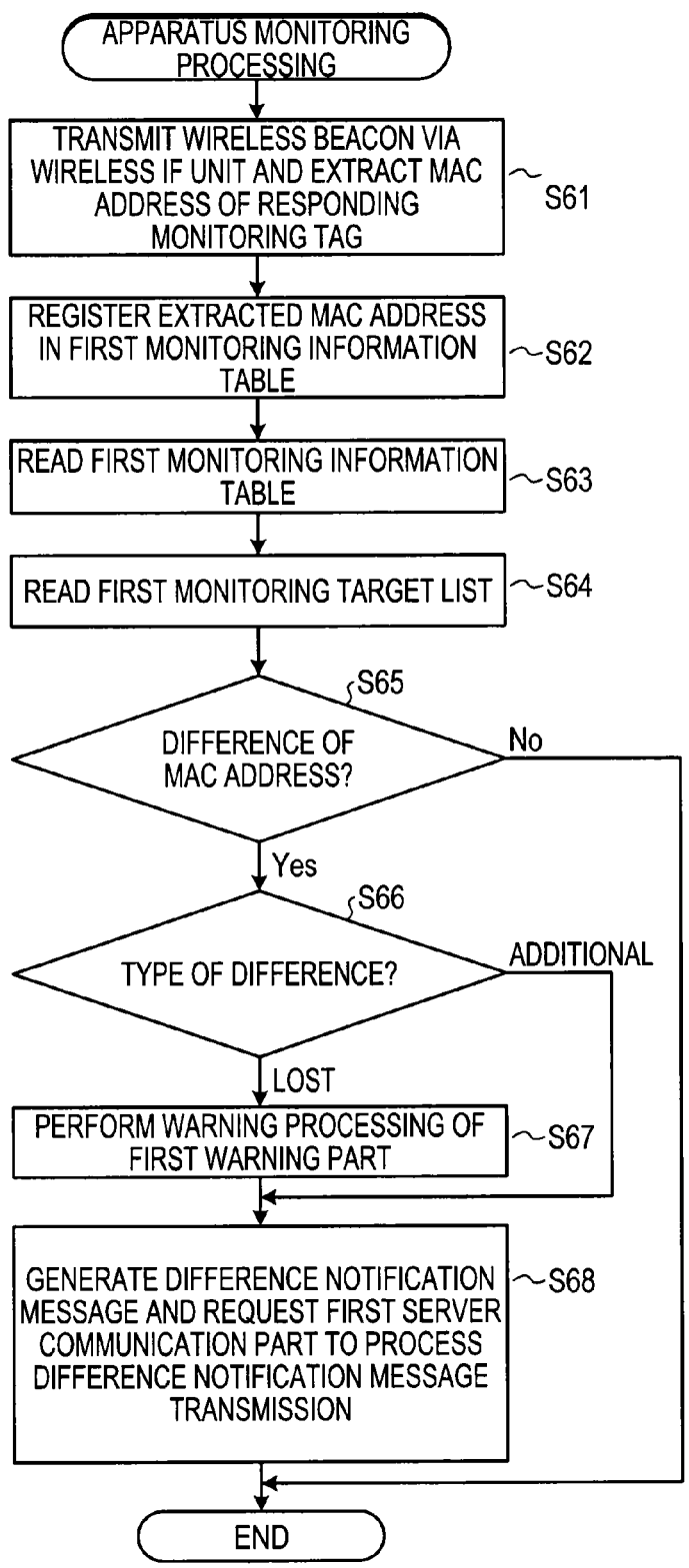
FIG. 20 is a diagram illustrating an example of an operational flowchart for apparatus monitoring processing of a first monitoring station, according to an embodiment.

FIG. 20 is a flowchart illustrating an example of the processing operation related to the apparatus monitoring processing of the first monitoring station 4. In FIG. 20, the first tag communication part 21 in the first monitoring station 4 regularly transmits the wireless beacon via the wireless IF unit 11A, and extracts the MAC address of the monitoring tag 3 responding to the wireless beacon (Step S61).

The first tag communication part 21 registers the extracted MAC address of the monitoring tag 3 in the first monitoring information table 25 (Step S62). The first difference detecting part 22 in the first monitoring station 4 reads the MAC address in the first monitoring information table 25 (Step S63), and reads the MAC address in the first monitoring target list 26 (Step S64). The first difference detecting part 22 determines whether or not there is a difference of MAC address by comparing the MAC address in the first monitoring information table 25 with the MAC address in the first monitoring target list 26 (Step S65).

When there is a difference of MAC address (Yes in Step S65), the first difference detecting part 22 determines the type of difference (Step S66). When the type of difference is "lost" ("lost" in Step S66), the first difference detecting part 22 outputs a warning, as the loss of the monitoring target apparatus 2 related to the monitoring tag 3 of "lost", through the first warning part 24 (Step S67).

After outputting the warning, the first difference detecting part 22 generates the difference notification message 93 including the difference information of the MAC address loss and requests the first server communication part 23 to transmit the difference notification message 93 to the monitoring server 6 (Step S68). Then, the processing operation illustrated in FIG. 20 is ended. When the type of difference of MAC address is "additional" ("additional" in Step S66), the first difference detecting part 22 proceeds to Step S68 to generate the difference notification message 93 including the additional difference information of MAC address. When there is no difference of MAC address (No in Step S65), the first difference detecting part 22 ends the processing operation illustrated in FIG. 20.

Based on the extraction of MAC address of the monitoring tag 3 corresponding to the response of the monitoring tag 3 to the wireless beacon, the first monitoring station 4 performing the apparatus monitoring processing illustrated in FIG. 20 informs the monitoring server 6 of the difference information of "additional" or "lost." This allows the first monitoring station 4 to inform the monitoring server 6 of "additional" or "lost" of the monitoring target apparatus 2.

Figure 21:
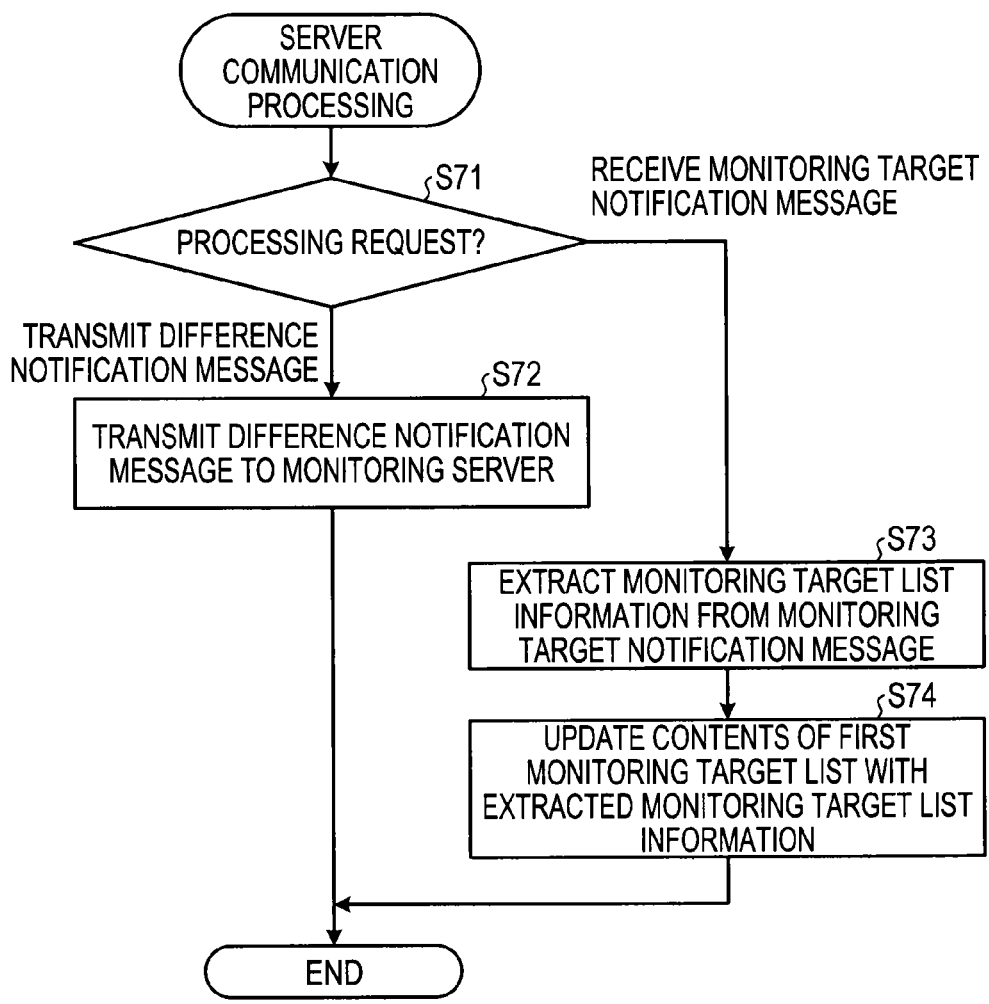
FIG. 21 is a diagram illustrating an example of an operational flowchart for server communication processing of a first monitoring station, according to an embodiment.

FIG. 21 is a flowchart illustrating an example of the processing operation related to the server communication processing of the first monitoring station 4. The first server communication part 23 in the first monitoring station 4 illustrated in FIG. 21 determines whether or not a processing request has been received (Step S71). When a processing request for transmission of the difference notification message 93 has been received (difference notification message in Step S71), the first server communication part 23 transmits the difference notification message 93 to the monitoring server 6 (Step S72) and ends the processing operation illustrated in FIG. 21.

When a processing request for reception of the monitoring target notification message 94 has been received (monitoring target notification message in Step S71), the first server communication part 23 extracts the monitoring target list information from the monitoring target notification message 94 (Step S73). The first server communication part 23 registers the contents of the monitoring target list information in the first monitoring target list 26 (Step S74), and ends the processing operation illustrated in FIG. 21.

Upon receiving the monitoring target notification message 94 from the monitoring server 6, the first monitoring station 4 performing the server communication processing illustrated in FIG. 21 registers the monitoring target list information in the monitoring target notification message 94 in the first monitoring target list 26. This allows the first monitoring station 4 to recognize the apparatus ID of the monitoring target apparatus 2 being monitored and the MAC address of the monitoring tag 3 attached to the monitoring target apparatus 2 by referring to the first monitoring target list 26.

Figure 22:
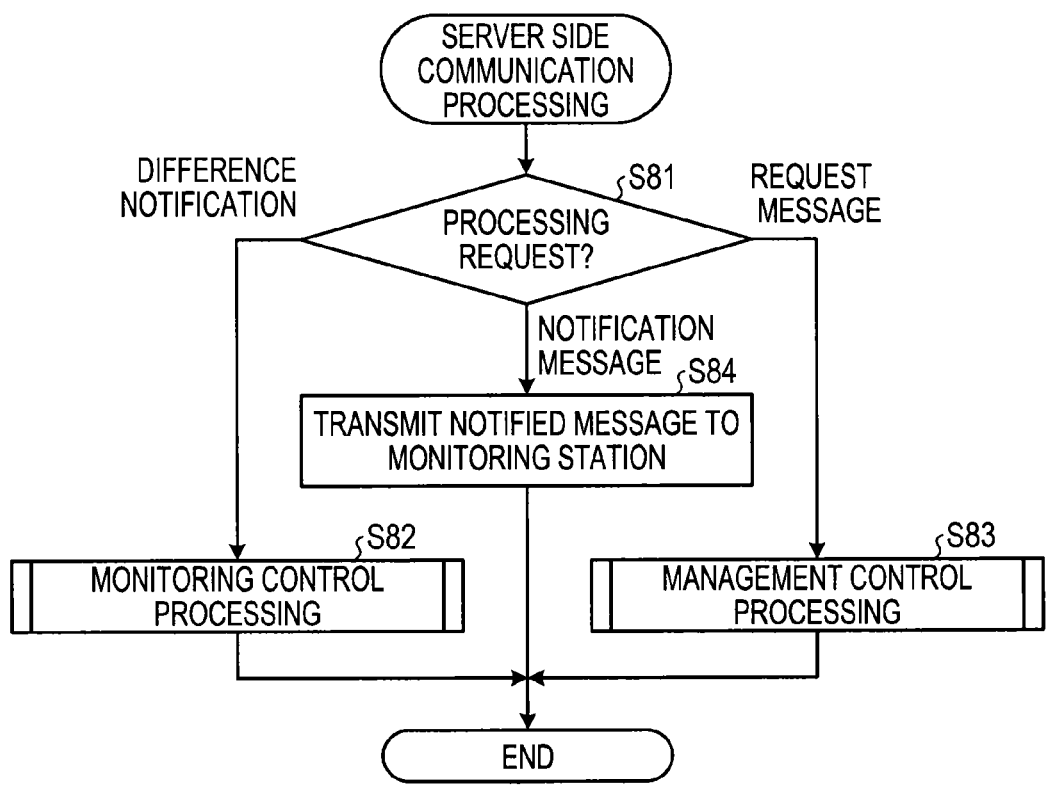
FIG. 22 is a diagram illustrating an example of an operational flowchart for server side communication processing of a monitoring server, according to an embodiment.

FIG. 22 is a flowchart illustrating an example of the processing operation related to the server side communication processing of the monitoring server 6. In FIG. 22, the communication control part 44 in the monitoring server 6 determines a received processing request (Step S81). When a received processing request is the difference notification message 93 from the first monitoring station 4 or the second monitoring station 5 (difference notification message in Step S81), the communication control part 44 performs the monitoring control processing illustrated in FIG. 23 (Step S82) and ends the processing operation illustrated in FIG. 22.

Figure 24:
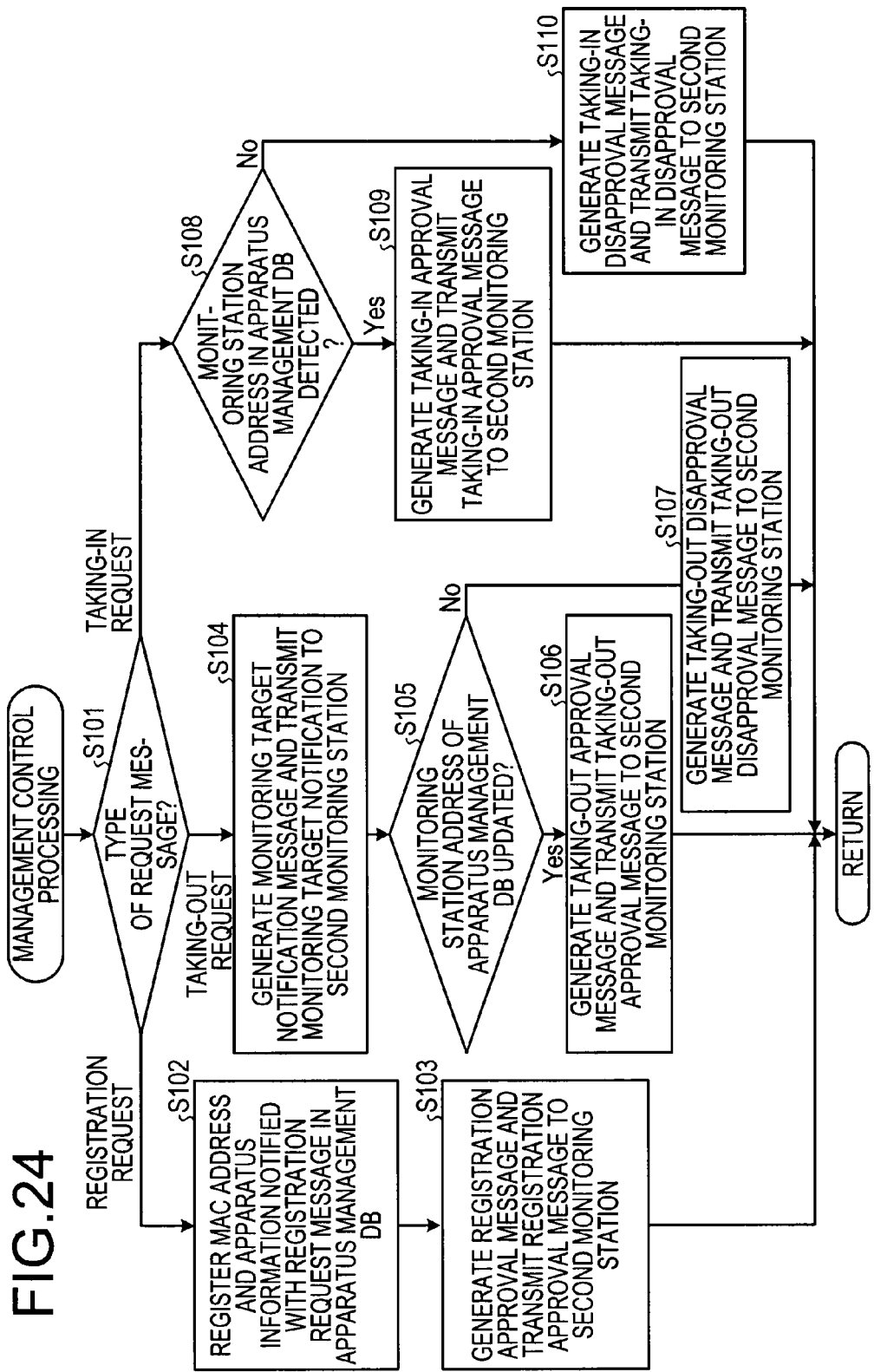
FIG. 24 is a diagram illustrating an example of an operational flowchart for management control processing of a monitoring server, according to an embodiment.

When a received processing request is, for example, a message of registration request, taking-out request, or taking-in request from second monitoring station 5 (request message in Step S81), the communication control part 44 performs the management control processing illustrated in FIG. 24 (Step S83) and ends the processing operation illustrated in FIG. 22.

When a received processing request is a message other than the difference notification message 93 and the request message (notification message in Step S81), the communication control part 44 transmits the notification message to the first monitoring station 4 or the second monitoring message 5 (Step S84) and ends the processing operation illustrated in FIG. 22.

Figure 23:
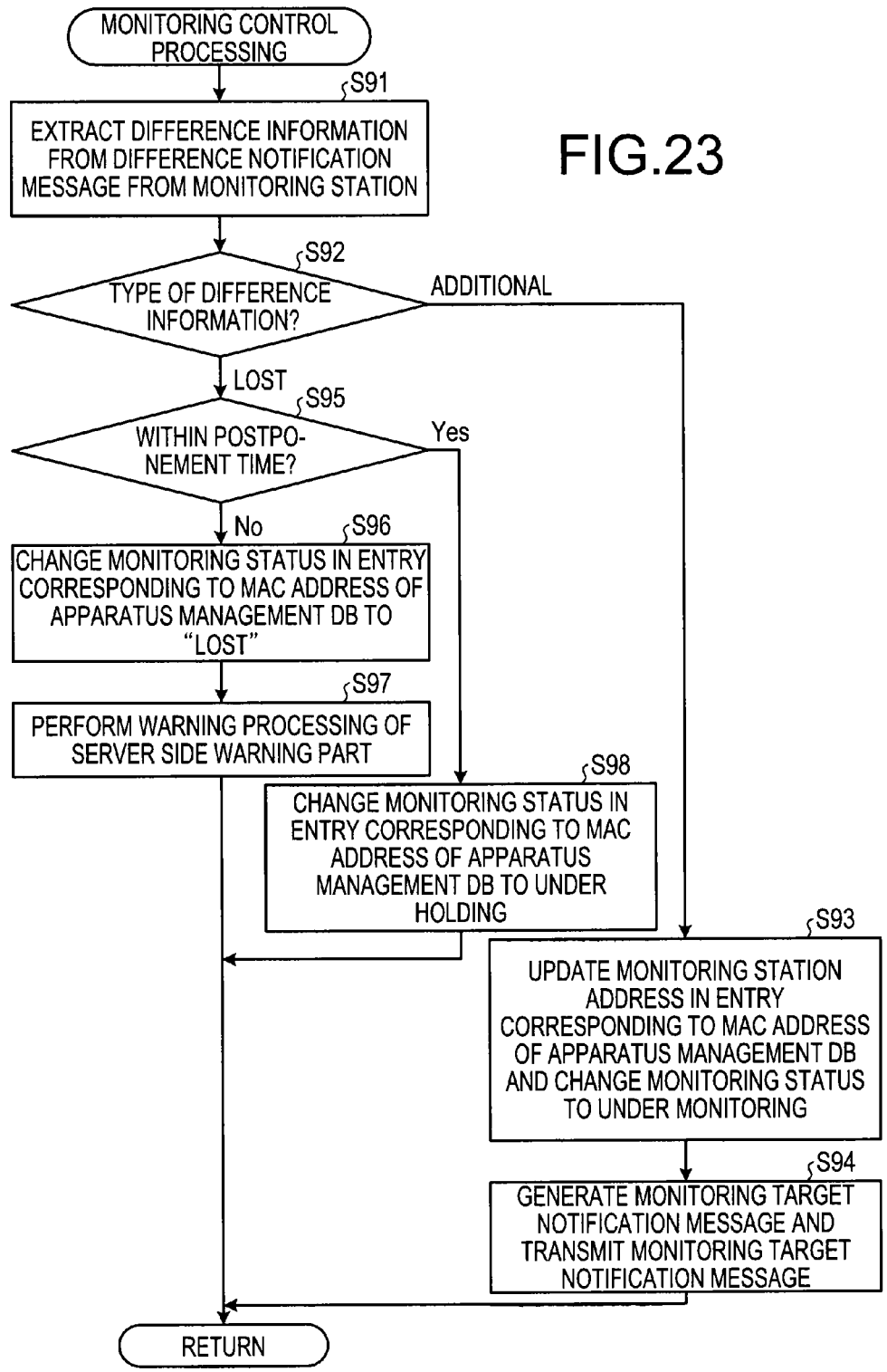
FIG. 23 is a diagram illustrating an example of an operational flowchart for monitoring control processing of a monitoring server, according to an embodiment.

FIG. 23 is a flowchart illustrating an example of the processing operation related to the monitoring control processing of the monitoring server 6. In FIG. 23, the monitoring control part 41 in the monitoring server 6 extracts the difference information from the difference notification message 93 transmitted from the first monitoring station 4 or the second monitoring station 5 (Step S91). The monitoring control part 41 determines the type of the extracted difference information (Step S92). When the type of the difference information is "additional" (additional in Step S92), the monitoring control part 41 updates the monitoring station address 45C in the entry corresponding to the MAC address of "additional" in the difference information of the apparatus management DB 45, and changes the monitoring status 45E to "under monitoring" (Step S93).

In addition, the monitoring control part 41 generates the monitoring target notification message 94 including the apparatus ID of the monitoring target apparatus 2 and the MAC address of the monitoring tag 3 (Step S94). In addition, the monitoring control part 41 transmits the generated monitoring target notification message 94 to the first monitoring station or the second monitoring station 5 which has transmitted the difference notification message 93 (Step S94), and ends the processing operation illustrated in FIG. 23.

When the type of the difference information is "lost" ("lost" in Step S92), the monitoring control part 41 references the postponement time 45H in the entry corresponding to the MAC address of the monitoring tag 3 of "lost" of the difference information. In addition, the monitoring control part 41 counts the lapse time after receiving the first difference notification message 93 related to the MAC address of the monitoring tag 3 of "lost," and determines whether or not the lapse time is within the referenced postponement time 45H (Step S95). When the lapse time is not within the postponement time 45H (No in Step S95), the monitoring control part 41 changes the monitoring status 45E in the entry corresponding to the MAC address of the monitoring tag 3 of "lost" of the difference information of the apparatus management DB 45 to "lost" (Step S96). In addition, the monitoring control part 41 performs the warning process of apparatus loss of the server side warning part 43 (Step S97) and ends the processing operation illustrated in FIG. 23.

When the lapse time is within the postponement time 45H (Yes in Step S95), the monitoring control part 41 changes the monitoring status 45E in the entry corresponding to the MAC address of the monitoring tag 3 of "lost" of the difference information of the apparatus management DB 45 to "under holding" (Step S98) and ends the processing operation illustrated in FIG. 23.

When extracting the difference information of "additional" from the difference notification message 93, the monitoring server 6 performing the monitoring control processing updates the monitoring station address 45C in the apparatus management DB 45 corresponding to the monitoring tag 3 of the MAC address of "additional," and updates the monitoring status 45E with "under monitoring." This allows the monitoring server 6 to recognize the added monitoring status 45E and monitoring station address 45C of the monitoring tag 3 by referring to the apparatus management DB 45.

When extracting the difference information of "lost" from the difference notification message 93, the monitoring server 6 references the postponement time 45H in the apparatus management DB 45 corresponding to the monitoring tag 3 of the MAC address of "lost." When the lapse time after receiving the first difference notification message 93 of "lost" is within the postponement time 45H, the monitoring server 6 updates the monitoring status 45E corresponding to the monitoring tag 3 with "under holding." This allows the monitoring server 6 to recognize the monitoring tag 3 of "under holding" by referring to the apparatus management DB 45. Thus, the monitoring server 6 is able to suppress output of loss warning due to the transient movement of the monitoring target apparatus 2.

When the lapse time after receiving the first difference notification message 93 of "lost" exceeds the postponement time 45H, the monitoring server 6 updates the monitoring status 45E corresponding to the monitoring tag 3 with "lost." This allows the monitoring server 6 to recognize the monitoring tag 3 of "lost" by referring to the apparatus management DB 45.

FIG. 24 is a flowchart illustrating an example of the processing operation related to the management control processing of the monitoring server 6. In FIG. 24, the management control part 42 in the monitoring server 6 determines the type of request message received from the second monitoring station 5 (Step S101). When the type of request message is the registration request message 91 (registration request in Step S101), the management control part 42 registers the apparatus ID of the monitoring target apparatus 2 and the MAC address of the monitoring tag 3 in the registration request message 91, in the apparatus management DB 45 (Step S102). In addition, the management control part 42 generates the registration approval message 92, transmits the registration approval message 92 to the second monitoring station 5 (Step S103), and ends the processing operation illustrated in FIG. 24.

When the type of request message is the taking-out request message 95 (taking-out request in Step S101), the management control part 42 generates the monitoring target notification message 94, transmits the monitoring target notification message 94 to the second monitoring station 5 (Step S104). After transmitting the monitoring target notification message 94, the management control part 42 determines whether or not the monitoring station address 95C of the apparatus management DB 45 has been updated (Step S105).

When the monitoring station address 95C has been updated (Yes in Step S105), the management control part 42 generates the taking-out approval message 96 for approval and transmits the taking-out approval message 96 for approval to the second monitoring station 5 (Step S106). Then, the management control part 42 ends the processing operation illustrated in FIG. 24.

When the monitoring station address 95C has not yet been updated (No in Step S105), the management control part 42 generates the taking-out approval message 96 for disapproval and transmits the taking-out approval message 96 for disapproval to the second monitoring station 5 (Step S107). Then, the management control part 42 ends the processing operation illustrated in FIG. 24.

When the type of request message is the taking-in request message 97 (taking-in request in Step S101), the management control part 42 determines whether or not the monitoring station address 95C of the taking-in destination in the apparatus management DB 45 has been detected (Step S108). When the monitoring station address 95C of the taking-in destination has been detected (Yes in Step S108), the management control part 42 generates the taking-in approval message 98 for approval and transmits the taking-in approval message 98 for approval to the second monitoring station 5 (Step S109). Then, the management control part 42 ends the processing operation illustrated in FIG. 24.

When the monitoring station address 95C of the taking-in destination has not yet been detected (No in Step S108), the management control part 42 generates the taking-in approval message 98 for disapproval and transmits the taking-in approval message 98 for disapproval to the second monitoring station 5 (Step S110). Then, the management control part 42 ends the processing operation illustrated in FIG. 24.

When detecting the registration request from the second monitoring station 5, the monitoring server 6 performing the management control processing registers the apparatus ID of the monitoring target apparatus 2 applied for registration and the MAC address of the monitoring tag 3 in the apparatus management DB 45, and transmits an approval for the registration request to the second monitoring station 5. This allows the monitoring server 6 to register the apparatus ID of the monitoring target apparatus 2 applied for registration and the MAC address of the monitoring tag 3 in the apparatus management DB 45.

When detecting the taking-out request from the second monitoring station 5, the monitoring server 6 transmits a monitoring target notification message including the apparatus ID of the monitoring target apparatus 2 and the MAC address of the monitoring tag 3 to the second monitoring station 5. This allows the monitoring server 6 to register the monitoring target apparatus 2 to be taken out, in the apparatus management DB 45.

When the monitoring station address 45C corresponding to the apparatus ID of the monitoring target apparatus 2 to be taken out has been updated by referring to the apparatus management DB 45 after taking-out request, the monitoring server 6 transmits a taking-out approval for the taking-out request to the second monitoring station 5. This allows the monitoring server 6 to approve the taking-out of the monitoring target apparatus 2 to be taken out.

When the monitoring station address 45C corresponding to the apparatus ID of the monitoring target apparatus 2 to be taken out has not yet been updated by referring to the apparatus management DB 45 after taking-out request, the monitoring server 6 transmits a taking-out disapproval against the taking-out request to the second monitoring station 5. This allows the monitoring server 6 to reject the taking-out of the monitoring target apparatus 2 to be taken out.

When the monitoring station address 45C of the taking-in destination corresponding to the apparatus ID of the monitoring target apparatus 2 to be taken in has been detected by referring to the apparatus management DB 45 after taking-in request, the monitoring server 6 transmits a taking-in approval for the taking-in request to the second monitoring station 5. This allows the monitoring server 6 to approve the taking-in of the monitoring target apparatus 2 to be taken in.

When the monitoring station address 45C of the taking-in destination corresponding to the apparatus ID of the monitoring target apparatus 2 to be taken in has not yet been detected by referring to the apparatus management DB 45 after taking-in request, the monitoring server 6 transmits a taking-in disapproval against the taking-in request to the second monitoring station 5. This allows the monitoring server 6 to reject the taking-in of the monitoring target apparatus 2 to be taken in.

Figure 25:
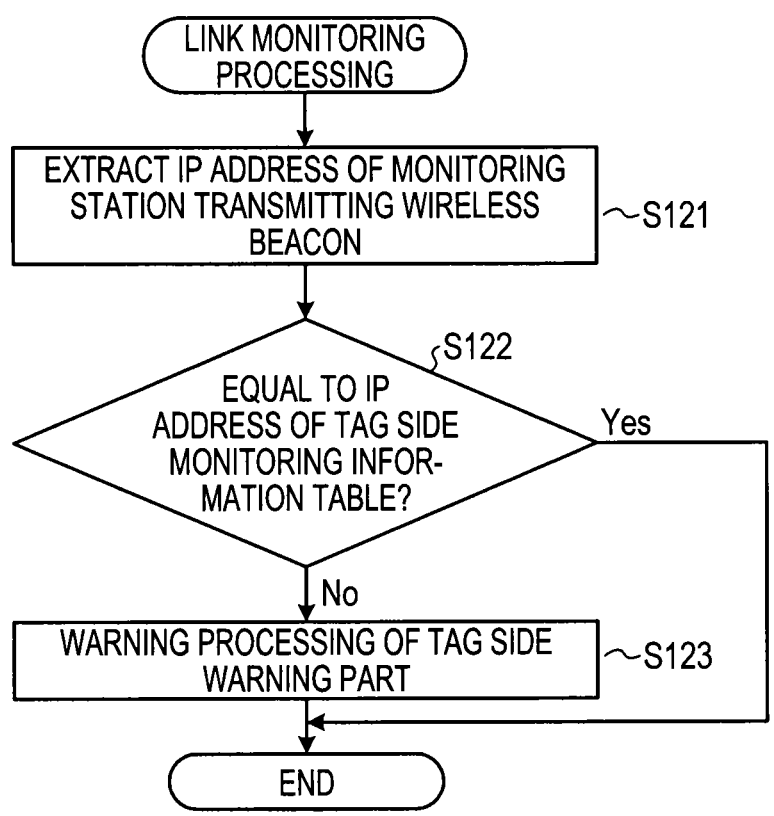
FIG. 25 is a diagram illustrating an example of an operational flowchart for link monitoring processing of a monitoring tag, according to an embodiment.

FIG. 25 is a flowchart illustrating an example of the processing operation related to the link monitoring processing of the monitoring tag 3. In FIG. 25, the link monitoring part 61 in the monitoring tag 3 receives a wireless beacon from the first monitoring station 4 or the second monitoring station 5, and extracts the IP address of the first monitoring station 4 or the second monitoring station 5 from the received wireless beacon (Step S121). The link monitoring part 61 determines whether or not the extracted IP address of the first monitoring station 4 or the second monitoring station 5 is equal to the IP address in the tag side monitoring information table 65 (Step S122). The IP address of the first monitoring station 4 or the second monitoring station 5 being currently monitored is stored in the tag side monitoring information table 65.

When the extracted IP address is equal to the IP address in the tag side monitoring information table 65 (Yes in Step S122), the link monitoring part 61 ends the processing operation illustrated in FIG. 25. When the extracted IP address is not equal to the IP address in the tag side monitoring information table 65 (No in Step S122), the link monitoring part 61 performs warning processing of the tag side warning part 64 and ends the processing operation illustrated in FIG. 25.

The monitoring tag 3 performing the processing operation illustrated in FIG. 25 extracts the IP address of the monitoring station from the received wireless beacon. When the extracted IP address is different from the IP address in the tag side monitoring information table 65, the monitoring tag 3 determines that the radio communication of the wireless beacon is disconnected, and outputs a warning. As a result, the monitoring tag 3 is able to inform persons around the monitoring target apparatus 2 attached with the monitoring tag 3 of the loss of the monitoring target apparatus 2.

Figure 26:
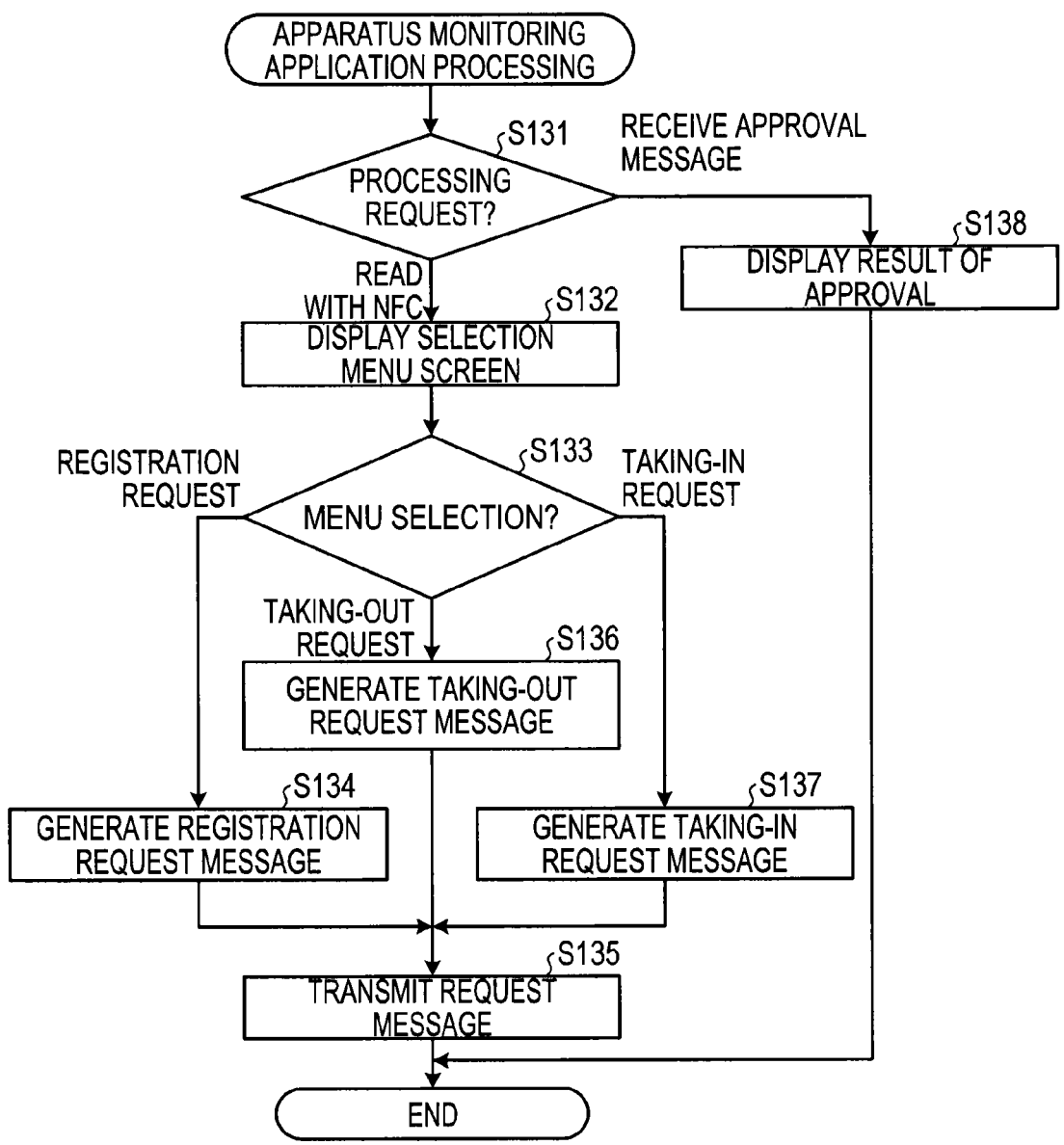
FIG. 26 is a diagram illustrating an example of an operational flowchart for apparatus monitoring application processing of a second monitoring station, according to an embodiment.

FIG. 26 is a flowchart illustrating an example of the processing operation related to the apparatus monitoring application processing of the second monitoring station 5. In FIG. 26, when a processing request is read in with NFC (NFC in Step S131), the apparatus monitoring application 84 in the second monitoring station 5 displays a selection menu screen (Step S132). The apparatus monitoring application 84 determines a selection menu from the selection menu screen (Step S133). The apparatus monitoring application 84 is to select a menu from the selection menu screen through the input unit 72. When the selection menu is registration request (registration request in Step S133), the apparatus monitoring application 84 generates the registration request message 91 (Step S134), transmits the registration request message 91 to the monitoring server 6 (Step S135), and ends the processing operation illustrated in FIG. 26.

When the selection menu is taking-out request (taking-out request in Step S133), the apparatus monitoring application 84 generates the taking-out request message 95 (Step S136) and proceeds to Step S135 to transmit the taking-out request message 95 to the monitoring server 6.

When the selection menu is taking-in request (taking-in request in Step S133), the apparatus monitoring application 84 generates the taking-in request message 98 (Step S137) and proceeds to Step S135 to transmit the taking-in request message 98 to the monitoring server 6.

When the processing request is an approval message from the monitoring server 6 (Approval message in Step S131), the apparatus monitoring application 84 displays a result of approval on the output unit 73 and ends the processing operation illustrated in FIG. 26. Examples of the approval message may include the registration approval message 92, the taking-out approval message 96, and the taking-in approval message 98.

The second monitoring station 5 performing the apparatus monitoring application processing illustrated in FIG. 26 reads the information of the monitoring tag 3 of the monitoring target apparatus 2 to be applied for, with NFC, and allows desired request to be selected from the selection menu screen. When the registration request is selected, the second monitoring station 5 generates the registration request message 91 of the monitoring target apparatus 2 to be registered and transmits the registration request message 91 to the monitoring server 6. This allows a user to simply apply for the monitoring target apparatus 2 to be registered.

When the taking-out request is selected, the second monitoring station 5 generates the taking-out request message 95 of the monitoring target apparatus 2 to be taken out and transmits the taking-out request message 95 to the monitoring server 6. This allows the user to simply apply for the monitoring target apparatus 2 to be taken out.

When the taking-in request is selected, the second monitoring station 5 generates the taking-in request message 97 of the monitoring target apparatus 2 to be taken in and transmits the taking-in request message 97 to the monitoring server 6. This allows the user to simply apply for the monitoring target apparatus 2 to be taken out.

The apparatus monitoring system 1 of this embodiment includes the first monitoring station 4 which is fixed in a predetermined position for monitoring the location of the monitoring target apparatus 2 in radio communication with the monitoring tag 3, and the second monitoring station 5 which is able to be moved for monitoring the location of the monitoring target apparatus 2 in radio communication with the monitoring tag 3. In the apparatus monitoring system 1, the radio communication with the monitoring tag 3 may be taken over between the first monitoring station 4 and the second monitoring station 5, and results of monitoring from the first monitoring station 4 or the second monitoring station 5 taking over the radio communication with the monitoring tag 3 are collected. As a result, since the location monitoring of the monitoring target apparatus 2 is able to be taken over between the first monitoring station 4 and the second monitoring station 5, it is possible to implement continuous location monitoring of the monitoring target apparatus 2 between these monitoring stations.

When the monitoring target apparatus 2 is designated by the second monitoring station 5, the monitoring server 6 takes over the radio communication of the designated monitoring target apparatus 2 with the monitoring tag 3 to the second monitoring station 5. As a result, a user of the second monitoring station 5 is able to transfer the location monitoring of the monitoring target apparatus 2 to the second monitoring station 5 according to a manipulation from the second monitoring station 5.

When no response of the monitoring tag 3 under radio communication to the wireless beacon is obtained, the first monitoring station 4 or the second monitoring station 5 outputs the notification information of loss of the monitoring target apparatus 2 attached with the monitoring tag 3 having no response. This allows third parties around the first monitoring station 4 or the second monitoring station 5 to be informed of the apparatus loss.

After postponement time elapses from the point of time when it is determined that no response of the monitoring tag 3 under radio communication to the wireless beacon is obtained, when no response to the wireless beacon is again obtained, the first monitoring station 4 or the second monitoring station 5 outputs notification information. As a result, a convenience may be improved since third parties around the first monitoring station 4 or the second monitoring station 5 is able to be informed of the apparatus loss while providing the postponement time.

The monitoring tag 3 receives the wireless beacon from the first monitoring station 4 or the second monitoring station 5 and extracts the transmission source IP address from the wireless beacon by referring to the tag side monitoring information table 65. In addition, when the extracted IP address is different from the IP address in the tag side monitoring information table 65, the monitoring tag 3 outputs notification information. As a result, even when the monitoring tag 3 is out of the radio communication range of the monitoring station which is monitoring the apparatus, third parties around the monitoring tag 3 are able to be informed of the apparatus loss.

Upon detecting the registration request of the monitoring target apparatus 2 to be taken out, from the second monitoring station 5, the monitoring server 6 takes over the location monitoring of the monitoring target apparatus 2 to be taken out to the second monitoring station 2 which applied for the registration, and monitors the location of the monitoring target apparatus 2 through the second monitoring station 5. As a result, it is possible to continuously monitor the location of the monitoring target apparatus 2 over the radio communication range of the first monitoring station 4 and the second monitoring station 5.

The monitoring server 6 monitors the location of the monitoring target apparatus 2 attached with the monitoring tag 3, based on the presence of a response of the monitoring tag 3 to the wireless beacon from the first monitoring station 4. When the monitoring target apparatus 2 is lost, the monitoring server 6 informs the manager terminal 7 of the loss with a warning mail.

When the monitoring target apparatus 2 to be registered, taken out, and taken in, is registered in the monitoring server 6, the second monitoring station 5 acquires the apparatus ID of the monitoring target apparatus 2 and the MAC address of the monitoring tag 3 by covering the monitoring tag 3 of the monitoring target apparatus 2 with NFC. This allows a user of the second monitoring station 5 to reduce input load related to registration request, taking-out request, and taking-in request.

Since the monitoring server 6 collects the difference information of the MAC address of the monitoring tag 3 responding to the wireless beacon from the first monitoring station or the second monitoring station 5, without performing confirmation of IP-level communication, even when more than tens of thousands of monitoring target devices 2 are provided, it is possible to limit network congestion.

Since the monitoring server 6 takes over the location monitoring of the monitoring target apparatus 2 from the first monitoring station 4 to the second monitoring station 5 according to a request from the second monitoring station 5, it is possible to continuously monitor the location of the monitoring target apparatus 2 without being limited to a particular place, for example, even when the monitoring target apparatus 2 is taken out of an office.

Since the monitoring server 6 takes over the location monitoring of the monitoring target apparatus 2 from the second monitoring station 5 to the first monitoring station 4 according to a request from the second monitoring station 5, it is possible to continuously monitor the location of the monitoring target apparatus 2, for example, even when the monitoring target apparatus 2 is taken into an office.

The monitoring server 6 of the above embodiment takes over the radio communication of location monitoring of the monitoring target apparatus 2 from the first monitoring station 4 to the second monitoring station 5 according to a registration request from the second monitoring station 5. However, the monitoring server 6 may take over the radio communication of location monitoring of the monitoring target apparatus 2 from the second monitoring station 5 to another second monitoring station 5 according to a registration request from the second monitoring station 5.

The monitoring server 6 of the above embodiment takes over the radio communication of location monitoring of the monitoring target apparatus 2 from the first monitoring station 4 to the second monitoring station 5 according to a registration request from the second monitoring station 5. However, for example, when the monitoring tag 3 of the monitoring target apparatus 2 is out of the radio communication range of the wireless beacon of the first monitoring station 4, the monitoring server 6 may take over the radio communication of location monitoring of the monitoring target apparatus 2 from the first monitoring station 4 to the second monitoring station 5.

Although the monitoring tag 3 of the above embodiment is attached to the monitoring target apparatus 2, the monitoring tag 3 may be incorporated in the monitoring target apparatus 2.

It is not necessary that elements of the illustrated units or parts are required to be physically as illustrated in the figures. In other words, detailed forms of distribution and integration of the illustrated units or parts are not limited to those illustrated in the figures but some or all of which may be functionally or physically distributed or integrated in any units depending on various loads and use situations.

Various processing functions performed by each of computers constituting a server and a client may be entirely or partially performed on CPU (Central Processing Unit) (or a microcomputer such as MPU (Micro Processing Unit) or MCU (Micro Controller Unit)). It should be understood that the various processing functions may be entirely or partially performed on programs parsed and executed by CPU (or a microcomputer such as MPU or MCU) or on hardware by wired logic.

Figure 27:
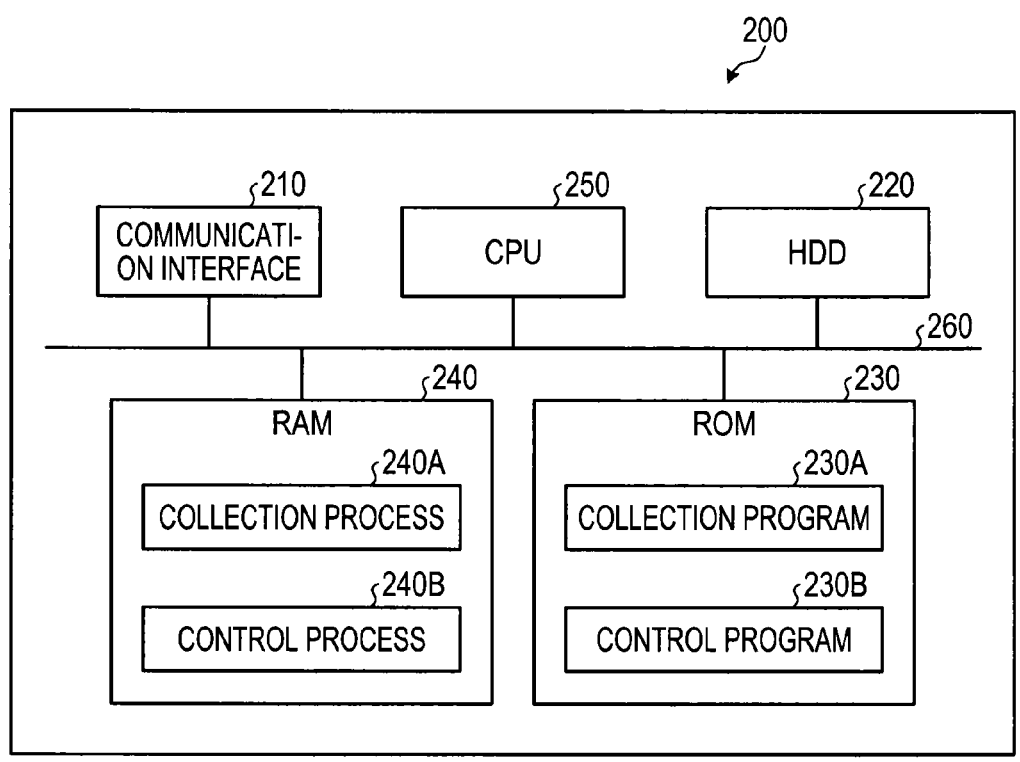
FIG. 27 is a diagram illustrating an example of a computer to execute an apparatus monitoring program, according to an embodiment.

The various processes described in this embodiment may be implemented by executing a prepared program on a computer. A computer to execute a program having the same function as the above embodiment will be described below by way of an example. FIG. 27 is an explanatory illustrating an example of a computer 200 to execute an apparatus monitoring program.

Referring to FIG. 27, the computer 200 to execute an apparatus monitoring program includes a communication interface 210, HDD 220, ROM 230, RAM 240, CPU 250, and a bus 260. The computer 200 to execute an apparatus monitoring program is used for an apparatus monitoring system. The apparatus monitoring system includes a first monitoring device which is disposed at a predetermined position for monitoring the location of a movable information apparatus in radio communication with the movable information apparatus, and a second monitoring device which is able to be moved for monitoring the location of the information apparatus in radio communication with the information apparatus.

An apparatus monitoring program to show the same function as the above embodiment is stored in the ROM 230. The apparatus monitoring program may be stored in a recording medium readable by a drive (not illustrated), instead of the ROM 230. Examples of the recording medium may include a portable recording medium such as CD-ROM, DVD disc, USB memory, and SD card, HDD, and a semiconductor memory such as a flash memory. The apparatus monitoring program includes a collection program 230A and a control program 230B. The collection program 230A and the control program 230B may be integrated or distributed as appropriate.

The CPU 250 reads these programs 230A and 230B from the ROM 230, and loads the read programs into a work area of the RAM 240, and executes them. The CPU 250 causes the programs 230A and 230B to function as a collection process 240A and a control process 240B, respectively, by executing the programs 230A and 230B in the work area of the RAM 240.

The CPU 250 collects results of monitoring from the first monitoring device disposed at the predetermined position or the second movable monitoring device. The CPU 250 is configured to take over the radio communication with the information apparatus between the first monitoring device and the second monitoring device. As a result, it is possible to continuously monitor the location of the information apparatus between these monitoring devices.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
    a first monitoring device disposed at a predetermined position, the first monitoring device including a first processor configured to monitor a location of an information apparatus that is movable, by performing a radio communication with the information apparatus;
    a second monitoring device that is movable, the second monitoring device including a second processor configured to monitor a location of the information apparatus by performing the radio communication with the information apparatus; and
    an apparatus monitoring device including a third processor configured to:
    cause the radio communication with the information apparatus to be taken over between the first monitoring device and the second monitoring device, and
    collect results of monitoring the information apparatus, from the first monitoring device or the second monitoring device which has taken over the radio communication with the information apparatus, wherein
    the third processor of the apparatus monitoring device is further configured to:
    when a monitoring target information apparatus to be monitored is designated by the second monitoring device, cause the second monitoring device to take over the radio communication with the monitoring target information apparatus from the first monitoring device, and
    collect results of monitoring of the location of the designated monitoring target information apparatus, from the second monitoring device.

2. The system of claim 1, wherein
when no response is obtained from the information apparatus in response to a transmission signal to the information apparatus via the radio communication, the first processor or the second processor outputs notification information.

3. The system of claim 1, wherein
after a predetermined time elapses from a first time point when no response has been obtained from the information apparatus in response to a transmission signal to the information apparatus via the radio communication, the first processor of the first monitoring device or the second processor of the second monitoring device outputs the notification information at a second time point when no response is again obtained from the information apparatus in response to the transmission signal to the information apparatus.

4. The system of claim 1, wherein
the information apparatus includes a fourth processor configured to:
store identification information of the first monitoring device or the second monitoring device with which the information apparatus is to perform radio communication;
receive a radio signal from the first monitoring device or the second monitoring device, and extract identification information identifying a transmission source, from the received radio signal; and
output notification information when the extracted identification information is different from the identification information stored in the storage unit.

5. An apparatus monitoring device for monitoring a movable information apparatus, the apparatus monitoring device comprising:
a processor configured to:
collect results of monitoring from a first monitoring device which is disposed at a predetermined position or a second monitoring device that is movable, each of the first monitoring device and the second monitoring device being configured to monitor a location of an information apparatus that is movable, by performing a radio communication with the information apparatus, and cause the radio communication with the information apparatus to be taken over between the first monitoring device and the second monitoring device; and a memory coupled to the processor, the memory being configured to store information on the first monitoring device and the second monitoring device, wherein the processor is further configured to:
when a monitoring target information apparatus to be monitored is designated by the second monitoring device, cause the second monitoring device to take over the radio communication with the monitoring target information apparatus from the first monitoring device, and collect results of monitoring of the location of the designated monitoring target information apparatus, from the second monitoring device.

6. A non-transitory, computer-readable recording medium having stored therein a program for causing a computer to execute a process comprising:

collecting results of monitoring from a first monitoring device which is disposed at a predetermined position or a second monitoring device that is movable, each of the first monitoring device and the second monitoring device being configured to monitor a location of an information apparatus that is movable, by performing a radio communication with the information apparatus; and causing the radio communication with the information apparatus to be taken over between the first monitoring device and the second monitoring device, wherein the process further includes:

when a monitoring target information apparatus to be monitored is designated by the second monitoring device, causing the second monitoring device to take over the radio communication with the monitoring target information apparatus from the first monitoring device, and collecting results of monitoring of the location of the designated monitoring target information apparatus, from the second monitoring device.

7. A method for monitoring a location of a movable information apparatus, the method being performed by a computer, the method comprising:

collecting results of monitoring from a first monitoring device which is disposed at a predetermined position or a second monitoring device that is movable, each of the first monitoring device and the second monitoring device being configured to monitor a location of an information apparatus that is movable, by performing a radio communication with the information apparatus; and causing the radio communication with the information apparatus to be taken over between the first monitoring device and the second monitoring device, wherein the method further includes:

when a monitoring target information apparatus to be monitored is designated by the second monitoring device, causing the second monitoring device to take over the radio communication with the monitoring target information apparatus from the first monitoring device, and collecting results of monitoring of the location of the designated monitoring target information apparatus, from the second monitoring device.

* * * * *